(12) United States Patent
Nevdahs et al.

(10) Patent No.: US 9,798,324 B2
(45) Date of Patent: Oct. 24, 2017

(54) AUTONOMOUS VEHICLE OPERATION

(71) Applicant: HELICO AEROSPACE INDUSTRIES SIA, Riga (LV)

(72) Inventors: Ilja Nevdahs, Riga (LV); Janis Spogis, Riga (LV); Nils Trapans, Garkalnes Novads (LV); Edgars Rozentals, Riga (LV); Agris Kipurs, Jelgava (LV)

(73) Assignee: HELICO AEROSPACE INDUSTRIES SIA, Riga (LV)

( * ) Notice: Subject to any disclaimer, the term of this patent is extended or adjusted under 35 U.S.C. 154(b) by 0 days.

(21) Appl. No.: 14/839,174

(22) Filed: Aug. 28, 2015

(65) Prior Publication Data

US 2016/0018822 A1    Jan. 21, 2016

Related U.S. Application Data

(63) Continuation-in-part of application No. PCT/IB2015/002057, filed on Jul. 20, 2015.

(60) Provisional application No. 62/026,700, filed on Jul. 20, 2014, provisional application No. 62/026,292, filed on Jul. 18, 2014.

(51) Int. Cl.
*G05D 1/00* (2006.01)
*G05D 1/08* (2006.01)

(52) U.S. Cl.
CPC ............. *G05D 1/0094* (2013.01); *G05D 1/00* (2013.01); *G05D 1/08* (2013.01)

(58) Field of Classification Search
USPC ......................................................... 701/26
See application file for complete search history.

(56) References Cited

U.S. PATENT DOCUMENTS

| | | |
|---|---|---|
| 7,228,232 B2 | 6/2007 | Bodin et al. |
| 7,299,130 B2 | 11/2007 | Mulligan et al. |
| 7,765,062 B2 | 7/2010 | Ariyur et al. |
| 7,970,507 B2 | 6/2011 | Fregene et al. |
| 8,355,834 B2 | 1/2013 | Duggan et al. |
| 8,543,265 B2 | 9/2013 | Ekhaguere et al. |
| 8,700,306 B2 | 4/2014 | Duggan et al. |
| 8,718,838 B2 | 5/2014 | Kokkeby et al. |
| 8,849,494 B1 | 9/2014 | Herbach et al. |

(Continued)

FOREIGN PATENT DOCUMENTS

CN    103267528 A    8/2013

OTHER PUBLICATIONS

Hexo+: Your Autonomous Aerial Camera—DRONE; http://www.kickstarter.com/projects/sqdr/hexo-your-autonomous-aerial-camera; retrieved on Aug. 26, 2015; 23 pages.

(Continued)

*Primary Examiner* — Anne M Antonucci
(74) *Attorney, Agent, or Firm* — Maschoff Brennan

(57) ABSTRACT

A method for an autonomous vehicle to follow a target is provided. The method may include obtaining a position and a velocity of a target and obtaining a position of an autonomous vehicle. The method may also include obtaining a path that encloses the position of the target and determining a path rate for the autonomous vehicle to move along the path based on the velocity of the target. The method may also include determining a path position along the path based on the position of the autonomous vehicle and determining a change in the position of the autonomous vehicle based on the path position, the path rate, and the velocity of the target. The method may also include adjusting a velocity and a direction of the autonomous vehicle to achieve the change in the position of the autonomous vehicle.

20 Claims, 22 Drawing Sheets

(56) References Cited

U.S. PATENT DOCUMENTS

| | | | |
|---|---|---|---|
| 9,019,376 B2 | 4/2015 | Lee et al. | |
| 9,026,272 B2* | 5/2015 | Kokkeby et al. | G01S 3/7864 |
| | | | 701/3 |
| 2010/0042269 A1* | 2/2010 | Kokkeby et al. | G01S 3/7864 |
| | | | 701/3 |
| 2015/0066248 A1 | 3/2015 | Arbeit et al. | |
| 2015/0205301 A1* | 7/2015 | Gilmore et al. | G05D 1/101 |
| | | | 701/11 |
| 2015/0350614 A1* | 12/2015 | Meier | H04N 7/188 |
| | | | 348/144 |

OTHER PUBLICATIONS

Iris+; http://gizmodo.com/new-autonomous-3d-robotics-drone-follows-you-wherever-y-1631694870; retrieved on Aug. 26, 2015; 1 page.

Lily; http://www.lily.camera/tech-specs/; retrieved on Aug. 26, 2015; 8 pages.

"From Motion Planning to Control"; http://www.ida.liu.se/~marwz54/papers/UAV_Bristol06_Navigation.pdf; retrieved on Aug. 26, 2015; 15 pages.

Probabilistic Roadmap Based Path Planning for an Autonomous Unmanned Aerial Vehicle; http://citeseerx.ist.psu.edu/viewdoc/download?doi=10.1.1.115.250&rep=rep1&type=pdf; retrieved on Aug. 26, 2015; 7 pages.

Drone Lily; http://www.coolthings.com/lily-autonomous-drone/; retrieved on Aug. 26, 2015; 13 pages.

"Aviatsionnye sistemy radioupravleniya, pod redaktsiei A.I. Kanaschenkova i dr. Tom 2," Radioelektronnye sistemy samonavedeniya. Moskva, Radiotekhnika, 2003, pp. 1-11.

International Search Report dated Apr. 14, 2016 as received in Application No. PCT/IB2015/002057.

Written Opinion of the International Searching Authority dated Apr. 14, 2016 as received in Application No. PCT/IB2015/002057.

* cited by examiner

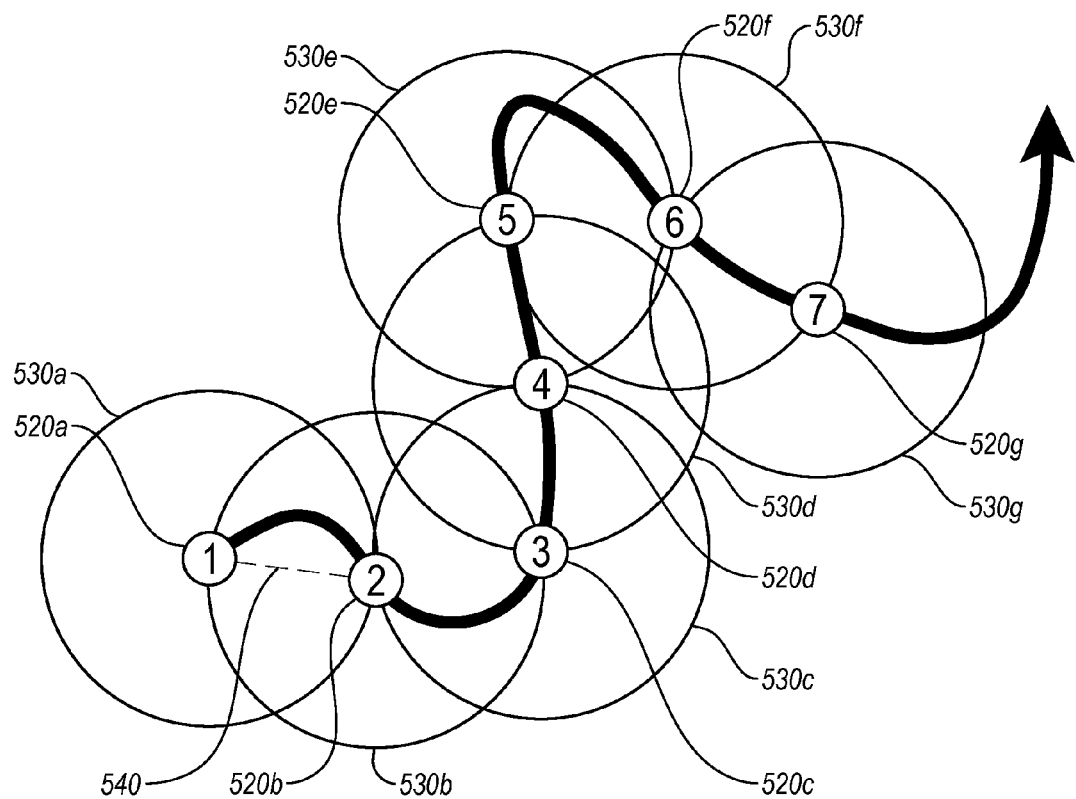
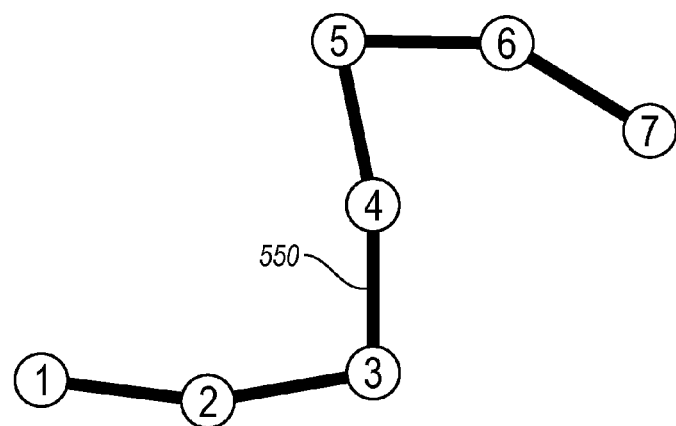
FIG. 5

AUTONOMOUS VEHICLE OPERATION

CROSS-REFERENCE TO OTHER APPLICATIONS

This patent application is a continuation-in-part of Patent Cooperation Treaty Application No. PCT/US2015/041209, filed on Jul. 20, 2015, which claims priority to U.S. Provisional Patent Application No. 62/026,692, filed on Jul. 20, 2014, and to U.S. Provisional Patent Application No. 62/026,700, filed on Jul. 20, 2014. The forgoing applications are incorporated herein by reference.

FIELD

The embodiments discussed herein relate to autonomous vehicle operation.

BACKGROUND

Autonomous vehicles, such as drones, may be used to obtain information, such as photographs and video, of objects. For example, drones have been used by militaries to fly over selected objects following preselected and particular flight paths and obtain pictures and videos of the objects.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method for an autonomous vehicle to follow a target is provided. The method may include obtaining a position and a velocity of a target and obtaining a position of an autonomous vehicle. The method may also include obtaining a path that encloses the position of the target and determining a path rate for the autonomous vehicle to move along the path based on the velocity of the target. The method may also include determining a path position along the path based on the position of the autonomous vehicle and determining a change in the position of the autonomous vehicle based on the path position, the path rate, and the velocity of the target. The method may also include adjusting a velocity and a direction of the autonomous vehicle to achieve the change in the position of the autonomous vehicle.

The object and advantages of the embodiments will be realized and achieved at least by the elements, features, and combinations particularly pointed out in the claims. It is to be understood that both the foregoing general description and the following detailed description are exemplary and explanatory and are not restrictive of the present disclosure, as claimed.

BRIEF DESCRIPTION OF THE DRAWINGS

Example embodiments will be described and explained with additional specificity and detail through the use of the accompanying drawings in which:

FIG. 5 illustrates an example of a second target following mode;

DESCRIPTION OF EMBODIMENTS

Some embodiments described in this description relate to an autonomous vehicle configured to follow a moving target in close proximity while capturing images or videos of the target. In some embodiments, the autonomous vehicle may be configured to avoid obstacles while following the moving target. In these and other embodiments, obstacle meta-data that defines an obstacle may be stored onboard the autonomous vehicle, wirelessly fetched from another device, or obtained in real time from sensors of the autonomous vehicle.

In some embodiments, the autonomous vehicle may refer to a flying unmanned aerial vehicle or system (UAV/UAS), a drone, an unmanned ground vehicle, an unmanned water vehicle, or any other type of autonomous vehicle.

In some embodiments, methods and/or systems described in this disclosure may uses real time position information about a target; an autonomous vehicle, and a sensor payload on the autonomous vehicle; orientation and motion data of the target, the autonomous vehicle, and the sensor payload; meta-data describing nearby obstacles; and particular following algorithms to generate steering and/or orientation commands for the autonomous vehicle and the sensor payload. The steering and/or orientation commands may allow the autonomous vehicle and/or the sensor payload to follow a target at a particular proximity and to obtain different photographic images or video images or obtain other data acquisition concerning the target.

In some embodiments, the particular following algorithms may include a set of movement algorithms that define autonomous vehicle behavior and target following patterns. These target following patterns may be referred to in this disclosure as target following modes. The target following modes may be user configurable and/or may be selected implicitly by a user or automatically by the autonomous vehicle depending on a position, a velocity, and/or a directional trajectory of a target with respect to a position, a velocity, and/or a directional trajectory of the autonomous vehicle.

In some embodiments, a target may be tracked by a tracking device such as a dedicated motion tracker device, smart phone, or other device. Alternately or additionally, a target may be tracked by detecting a position, a velocity, and/or a directional trajectory of the target with sensors, such as computer vision cameras, radars, or lasers of the autonomous vehicle.

Figure 1:
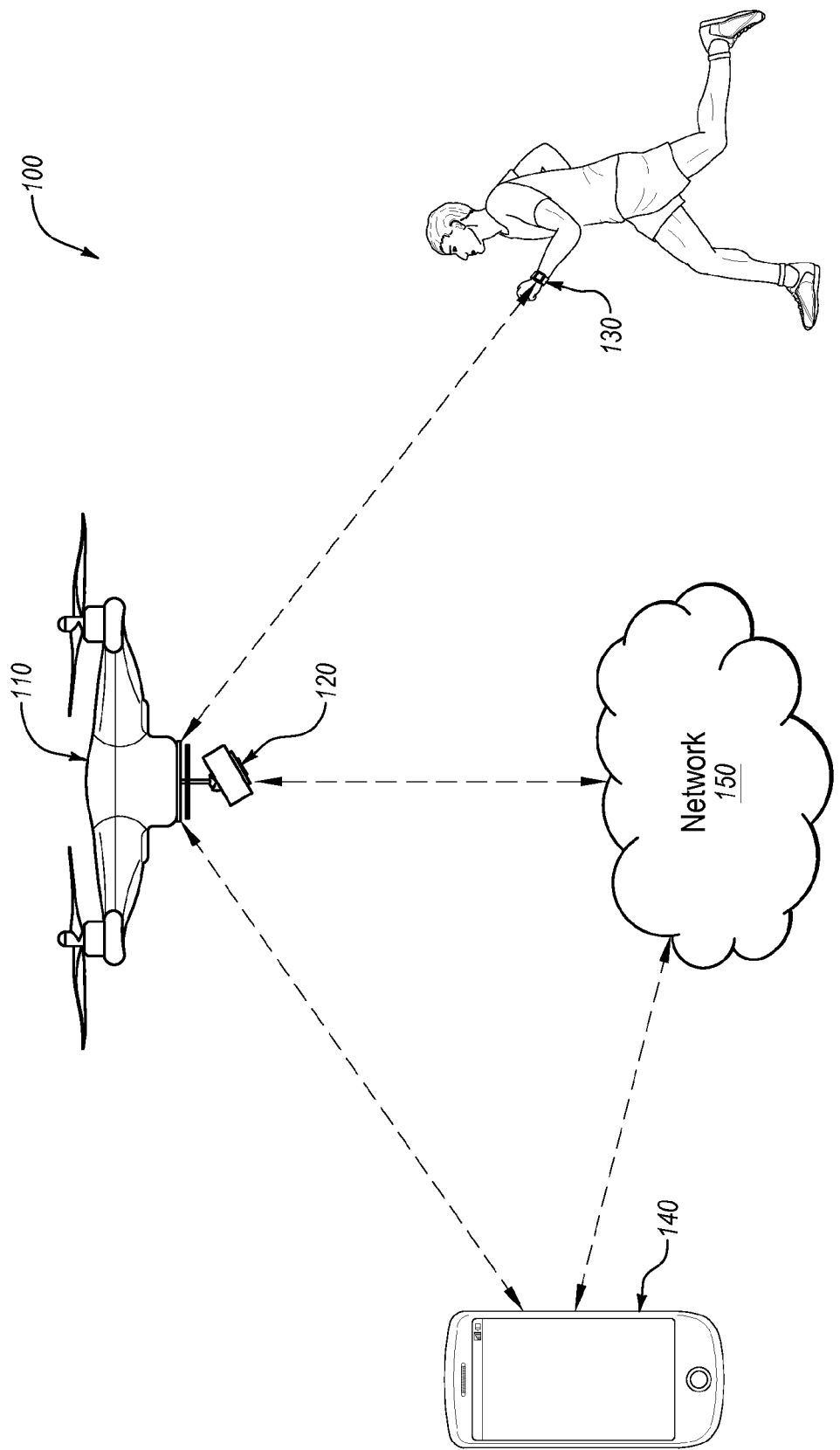
FIG. 1 illustrates an example system for following a target.

FIG. 1 illustrates an example system 100 for following a target, arranged in accordance with at least one embodiment described in this disclosure. In some embodiments, the system 100 may include an autonomous vehicle 110 that includes a sensor payload 120, a motion tracking device 130, a computing device 140, and a data storage 150.

The autonomous vehicle 110 may be any type of unmanned vehicle that is configured to autonomously move according to a selected following mode. In some embodiments, the autonomous vehicle 110 autonomously moving may indicate that the autonomous vehicle 110 is selecting a direction and speed of movement based on one or more calculations determined by the autonomous vehicle 110 or some other computer source. Autonomously moving may further indicate that a human being is not directing the movements of the autonomous vehicle 110 through direct or remote control of the autonomous vehicle 110.

The autonomous vehicle 110 is depicted in FIG. 1 as a flying drone that flies through the air, but this disclosure is not limited to only flying drones. Rather the autonomous vehicle 110 may be any type of autonomous vehicle, such as a drone that travels across the ground on wheels, tracks, or some other propulsion system. Alternately or additionally, the autonomous vehicle 110 may be a water drone that travels across or under the water.

The autonomous vehicle 110 may be configured to determine and/or estimate real time location data about the autonomous vehicle 110. In some embodiments, the location data may include real time position, orientation, velocity, acceleration, and/or trajectory in 3D space of the autonomous vehicle 110. The autonomous vehicle 110 may be equipped with one or more sensors to determine the location data. The sensors may include one or more of gyroscopes, accelerometers, barometers, magnetic field sensors, and global positioning sensors, among other sensors.

The autonomous vehicle 110 may be further configured to communicate with other components of the system 100 using wireless data communications. The wireless data communications may occur using any type of one or more wireless networks. For example, the wireless networks may include BLUETOOTH® communication networks and/or cellular communications networks for sending and receiving data, or other suitable wireless communication protocol/networks (e.g., wireless fidelity (Wi-Fi), ZigBee, etc.). For example, in some embodiments, the autonomous vehicle 110 may provide its location data over a wireless network to other components of the system 100. Alternately or additionally, the autonomous vehicle 110 may receive information from other components over a wireless network. For example, the autonomous vehicle 110 may receive location data of the motion tracking device 130 over a wireless network.

The sensor payload 120 may be coupled to the autonomous vehicle 110. The sensor payload 120 may include sensors to record information about the motion tracking device 130 or a device or person associated with the motion tracking device 130. For example, the sensor payload 120 may be a camera configured to capture photographic images or video images of the motion tracking device 130 or a device or person associated with the motion tracking device 130. Alternately or additionally, the sensor payload 120 may be configured to obtain other information about the motion tracking device 130 or a device or person associated with the motion tracking device 130. In some embodiments, the sensor payload 120 may provide the image, video, and/or data to the autonomous vehicle 110. In these and other embodiments, the autonomous vehicle 110 may provide the image, video, and/or data to other components of the system 100 using wireless data communications.

In some embodiments, the sensor payload 120 may include other sensors to generate location data of a device or person. The location data may include position, orientation, velocity, acceleration, and/or trajectory of the device or person. For example, the sensor payload 120 may include an ultrasonic or laser rangefinder, radar, or other type of sensor that is configured to provide location data of a device or person separate from the sensor payload 120 and the autonomous vehicle 110. The sensor payload 120 may be configured to provide the location data to the autonomous vehicle 110. In these and other embodiments, the autonomous vehicle 110 may provide the location data to other components of the system 100 over a wireless communication network.

The motion tracking device 130 may be configured to determine and/or estimate real-time location data about the motion tracking device 130 and thus about the device or person associated with the motion tracking device 130. In some embodiments, the location data may include real-time position, orientation, velocity, acceleration, and/or trajectory in 3D space of the motion tracking device 130. The motion tracking device 130 may be equipped with one or more sensors to determine the location data. The sensors may include one or more gyroscopes, accelerometers, barometers, magnetic field sensors, and/or global positioning sensors, among other sensors.

In some embodiments, the motion tracking device 130 may be further configured to communicate with other components of the system 100 using a wireless communication network. In these and other embodiments, the motion tracking device 130 may provide its location data to the autonomous vehicle 110.

As indicated, the motion tracking device 130 may be associated with a person or device. For example, the motion tracking device 130 may be associated with a person or device based on the physical proximity of the motion tracking device 130 with the person or device. For example, the motion tracking device 130 may be associated with a person when the person is wearing the motion tracking device 130. As such, the location data of the motion tracking device 130 may be used as a substitute for the location data of the associated device or person. As such, when the motion tracking device 130 determines its location data, the motion tracking device 130 may also determine the location data of the person or the device associated with the motion tracking device 130.

In some embodiment, the motion tracking device 130 may include a user interface to allow a user of the autonomous vehicle 110 to enter and/or select operation parameters and following modes for the autonomous vehicle 110. In these and other embodiments, the motion tracking device 130 may include a touch-screen or some other user interface. In some embodiments, the user of the autonomous vehicle 110 may be the person associated with the motion tracking device 130.

The computing device 140 may be configured to communicate with the autonomous vehicle 110, the motion tracking device 130, and the data storage 150 using a wireless communication network. In some embodiments, the computing device 140 may be configured to receive data, such as location data and operating data from the autonomous vehicle 110 and the motion tracking device 130.

In some embodiments, the computing device 140 may be configured to receive data from the sensor payload 120. For example, the computing device 140 may receive images or video from the sensor payload 120.

In some embodiments, the computing device 140 may be configured to store and provide operation parameters for the autonomous vehicle 110. For example, the computing device 140 may send parameters regarding following modes or a selected following mode to the autonomous vehicle 110.

In some embodiments, the computing device 140 may include a user interface to allow a user of the autonomous vehicle 110 to enter and/or select operation parameters and following modes for the autonomous vehicle 110. In these and other embodiments, the computing device 140 may include a touch-screen or some other user interface. In these and other embodiments, the computing device 140 may be a device that performs the functionality described in this disclosure based on software being run by the computing device 140. In these and other embodiments, the computing device 140 may perform other functions as well. For example, the computing device 140 may be laptop, tablet, smartphone, or some other device that may be configured to run software to perform the operations described herein.

The data storage 150 may be a cloud-based data storage that may be accessed over a wireless communication network. In these and other embodiments, the data storage 150 may be configured to communicate with the autonomous vehicle 110, the motion tracking device 130, and the data storage 150 over the wireless communication network. In some embodiments, the data storage 150 may be configured to receive data, such as location data and operating data, from the autonomous vehicle 110 and the motion tracking device 130.

In some embodiments, the data storage 150 may be configured to store following modes and other operational parameters for the autonomous vehicle 110. In these and other embodiments, a user may select operational parameters using the computing device 140. The computing device 140 may indicate the selection of the user to the data storage 150. The data storage 150 may be configured to provide the selected operational parameters to the autonomous vehicle 110.

In some embodiments, the operational parameters may include path restriction data. In some embodiments, the path restriction data may be received from a user by way of the computing device 140. In these and other embodiments, the path restriction data may be data that indicates an area in which the user would like to confine the travel of the autonomous vehicle 110. Alternately or additionally, the path restriction data may be data that indicates an area in which the user would like the autonomous vehicle 110 to not travel, such that the autonomous vehicle 110 avoids those areas. For example, an obstacle may be in an area that may be traversed by the autonomous vehicle 110. Path restriction data may include information about the location of the obstacle. Using the path restriction data, the autonomous vehicle 110 may be able to avoid the obstacle.

An example of the operation of the system 100 follows. The autonomous vehicle 110 may receive a following mode and operations parameters for the following mode from the computing device 140. The autonomous vehicle 110 may further receive path restriction data from the data storage 150. The autonomous vehicle 110 may be launched and begin to receive location data from the motion tracking device 130. When the location data from the motion tracking device 130 indicates that a person wearing the motion tracking device 130 is moving, the autonomous vehicle 110 may adjust its position to follow the person. Furthermore, the autonomous vehicle 110 may direct the sensor payload 120 to adjust an angle of a camera to maintain the person in a particular field of view that may be selected based on the operation parameters. In a similar manner, the autonomous vehicle 110 may continue to track and obtain video images of the person as the person moves. For example, the person may be performing some sort of sport activity, such as skiing, snowboarding, wind surfing, surfing, biking, hiking, roller blading, skate boarding, or some other activity. The autonomous vehicle 110 may follow the person based on the selected following mode, avoid obstacles and/or path restriction areas, and maintain the camera from the sensor payload 120 focused on and obtaining video of the person while the person performs the activity.

Modifications, additions, or omissions may be made to the system 100 without departing from the scope of the present disclosure. For example, in some embodiments, the system 100 may not include the data storage 150. Alternately or additionally, the system 100 may not include the computing device 140. In these and other embodiments, the autonomous vehicle 110 or the motion tracking device 130 may include a user interface. In some embodiments, the system 100 may not include the motion tracking device 130. In these and other embodiments, the sensor payload 120 may be configured to track a person or device without receiving location information of the person or device. In some embodiments, the system 100 may include multiple motion tracking devices and multiple sensor payloads. In these and other embodiments, each of the sensor payloads may be associated with one of the motion tracking devices. Alternately or additionally, the system 100 may include multiple motion tracking devices and a single sensor payload. In these and other embodiments, the single sensor payload may collect data about one or more of the multiple motion tracking devices.

Figure 2:
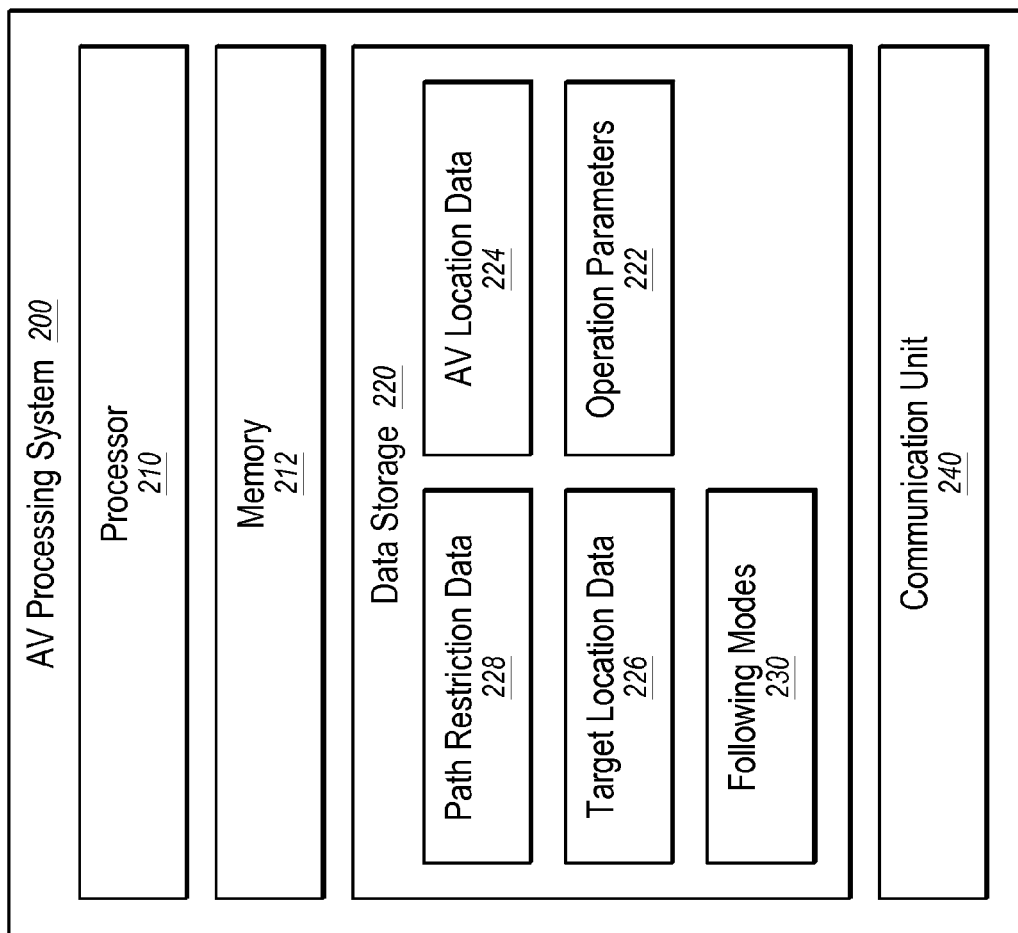
FIG. 2 is a block diagram of an example autonomous vehicle processing system.

FIG. 2 is a block diagram of an example autonomous vehicle processing system, which may be arranged in accordance with at least one embodiment described in this disclosure. As illustrated in FIG. 2, the system 200 may include a processor 210, a memory 212, a data storage 220, and a communication unit 240.

Generally, the processor 210 may include any suitable special-purpose or general-purpose computer, computing entity, or processing device including various computer hardware or software modules and may be configured to execute instructions stored on any applicable computer-readable storage media. For example, the processor 210 may include a microprocessor, a microcontroller, a digital signal processor (DS), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, it is understood that the processor 210 may include any number of processors distributed across any number of network or physical locations that are configured to perform individually or collectively any number of operations described herein. In some embodiments, the processor 210 may interpret and/or execute program instructions and/or process data stored in the memory 212, the data storage 220, or the memory 212 and the data storage 220.

In some embodiments, the processor 210 may fetch program instructions and/or data from the data storage 220 and load the program instructions in the memory 212. After the program instructions and/or data are loaded into the memory 212, the processor 210 may execute the program instructions using the data. In some embodiments, executing the program instructions using the data may result in commands to control movement, location, orientation of an autonomous vehicle and/or a sensor payload of the autonomous vehicle. For example, executing the program instructions using the data may result in commands to control movement, location, and/or orientation of the autonomous vehicle 110 and the sensor payload 120 of FIG. 1.

The memory 212 and the data storage 220 may include one or more computer-readable storage medias for carrying or having computer-executable instructions and/or data structures stored thereon. Such computer-readable storage media may be any available media that may be accessed by a general-purpose or special-purpose computer, such as the processor 210. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 210 to perform a certain operation or group of operations.

The communication unit 240 may be configured to receive data that may be stored in the data storage 220 and to send data and/or instructions generated by the processor 210. For example, in some embodiments, the communication unit 240 may be configured to receive operation parameters 222 from a computing device and store the operation parameters 222 in the data storage 220. In these and other embodiments, the communication unit 240 may be configured to receive target location data 226 from a motion tracking device and store the target location data 226 in the data storage 220. In these and other embodiments, the communication unit 240 may also be configured to receive path restriction data 228 from a cloud-based data storage and AV location data 224 from sensors in the autonomous vehicle and to store the path restriction data 228 and the AV location data 224 in the data storage 220.

An example description of the operation of the system 200 follows. The operation parameters 222 may be loaded into the memory 212 and read by the processor 210. The operation parameters 222 may indicate a following mode to use. In these and other embodiments, the processor 210 may load the particular following mode 230 into the memory 212 and execute the particular following mode 230. When executing the particular following mode 230, the processor 210 may determine steering/velocity/orientation commands for the autonomous vehicle and orientation commands for the sensor payload. The processor 210 may determine the steering/velocity/orientation commands and the orientation commands based on the particular following mode 230 and data stored in the data storage 220. For example, the processor 210 may determine the steering/velocity/orientation commands and the orientation commands based on the operation parameters 222, the AV location data 224, the target location data 226, and/or the path restriction data 228.

In some embodiments, the operation parameters 222 may include data indicating a distance to maintain between the autonomous vehicle and a selected target. In some embodiments, the operation parameters 222 may include an altitude for the autonomous vehicle to maintain over the selected target. Alternately or additionally, the operation parameters 222 may include parameters for the selected following mode and estimation parameters for target position and movement.

In some embodiments, the AV location data 224 may include real-time position, orientation, velocity, acceleration, and/or trajectory in 3D space of the autonomous vehicle. In some embodiments, the target location data 226 may include real-time position, orientation, velocity, acceleration, and/or trajectory in 3D space of the target. In some embodiments, the path restriction data 228 may include locations in which the autonomous vehicle may be allowed or not allowed to traverse based on data previously obtained and stored before operation of the autonomous vehicle on a particular occasion. In these and other embodiments, the path restriction data 228 may also include information about obstacles or other objects that are sensed by the autonomous vehicle during the operation of the autonomous vehicle on this particular occasion.

The determined steering commands generated by the processor 210 may be sent by the communication unit 240 to other portions of the autonomous vehicle to steer and/or control a velocity of the autonomous vehicle. The steering commands may alter or maintain a course, position, velocity, and/or orientation of the autonomous vehicle. In some embodiments, the steering commands may alter or maintain a course, position, and/or orientation of the autonomous vehicle such that the autonomous vehicle adheres to the selected following mode with respect to the operation parameters 222 to follow the target.

The determined orientation commands generated by the processor 210 may be sent by the communication unit 240 to the sensor payload of the autonomous vehicle to control the sensor payload. The steering commands may alter or maintain a position and/or orientation of the sensor payload. In some embodiments, the orientation commands may alter or maintain the position and/or orientation of the sensor payload such that the sensor payload adheres to the selected following mode with respect to the operation parameters 222 to obtain particular data about the target, such as images, videos, and/or continuous images/videos of the target at a particular angle or view. Various following modes are discussed with respect to other figures described in this disclosure.

Modifications, additions, or omissions may be made to the system 200 without departing from the scope of the present disclosure. For example, one or more portions of the data storage 220 may be located in multiple locations and accessed by the processor 210 through a network, such as a wireless communication network.

Figure 3:
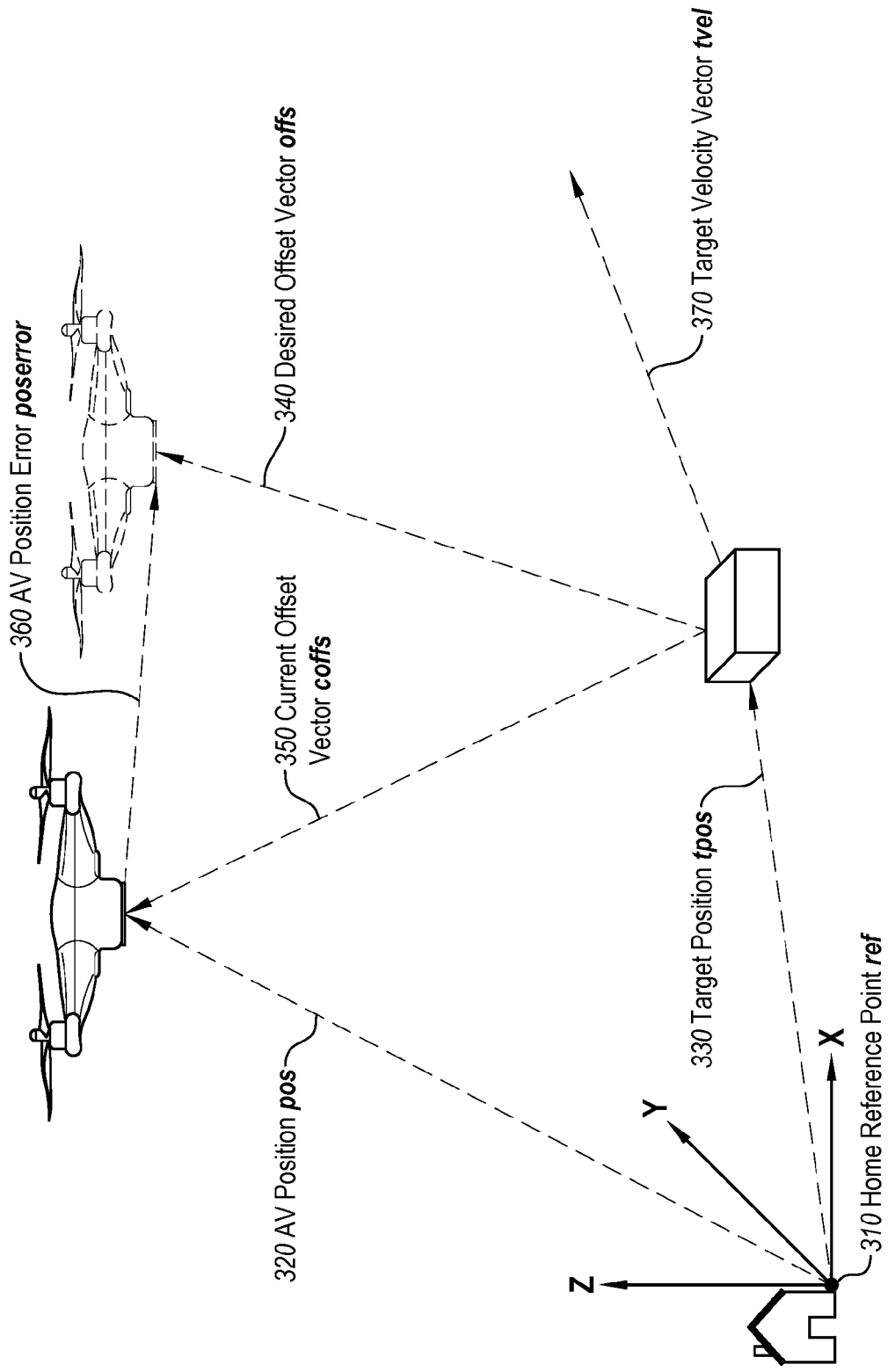
FIG. 3 illustrates various vectors used in a first target following mode.

FIG. 3 illustrates various vectors used in a first target following mode, which may be arranged in accordance with at least one embodiment described in this disclosure. In some embodiments, in the first target following mode an autonomous vehicle may maintain a particular offset from the target and may aim a camera or other sensors at the target. In some embodiments, when this mode is implemented for an aerial vehicle, the particular offset may be defined by a three-dimensional vector pointing from the target to a particular position of the autonomous vehicle. In some embodiments, the particular offset may be preset in a mode configuration prior to mode execution or may be set dynamically by repositioning the autonomous vehicle of the target and resetting the offset by user request or automatically on mode activation.

In some embodiments, when set from a mode configuration, the particular offset may be represented by a distance and altitude relative to target and relative to an angle in relation to North or other reference or as a vector in a global or local coordinate systems. For an example, a user may set a quadcopter to film him or her from a 45 degrees NW angle at a 10 meter altitude from a total distance of 12 meters.

In the example illustrated in FIG. 3, the vectors and coordinates are presented in the three-dimensional local coordinate system with its origin presented as "Home position" point reference 310 with coordinates X=0, Y=0 and Z=0. The description of the point reference 310 having coordinates X=0, Y=0 and Z=0 and being a XYZ coordinate system is provided for simplicity. Other implementations may operate with different coordinate systems and/or point reference 310 locations within the different coordinate systems and a conversion between the different coordinate systems may occur based on operation of the autonomous vehicle.

In the example illustrated in FIG. 3, absolute coordinates of the autonomous vehicle and the target are converted to local coordinates and are represented by a current position of the autonomous vehicle vector (pos) 320 and current position of the target vector (tpos) 330. Furthermore, an absolute velocity vector of the target is represented by a current velocity vector of the target (tvel) 370, respectively. FIG. 3 further illustrates a current offset vector (coffs) 350 that represent a current positional relationship between the autonomous vehicle and the target, a particular or desired offset vector (offs) that represents a particular positional relationship between the autonomous vehicle and the target that may be used to achieve a particular sensing of the target with a payload sensor attached to the autonomous vehicle, a position error vector (poserror) 360 that represents a position error between the current location of the autonomous vehicle and a particular position of the autonomous vehicle. Modifications, additions, or omissions may be made to the vectors without departing from the scope of the present disclosure.

Figure 4:
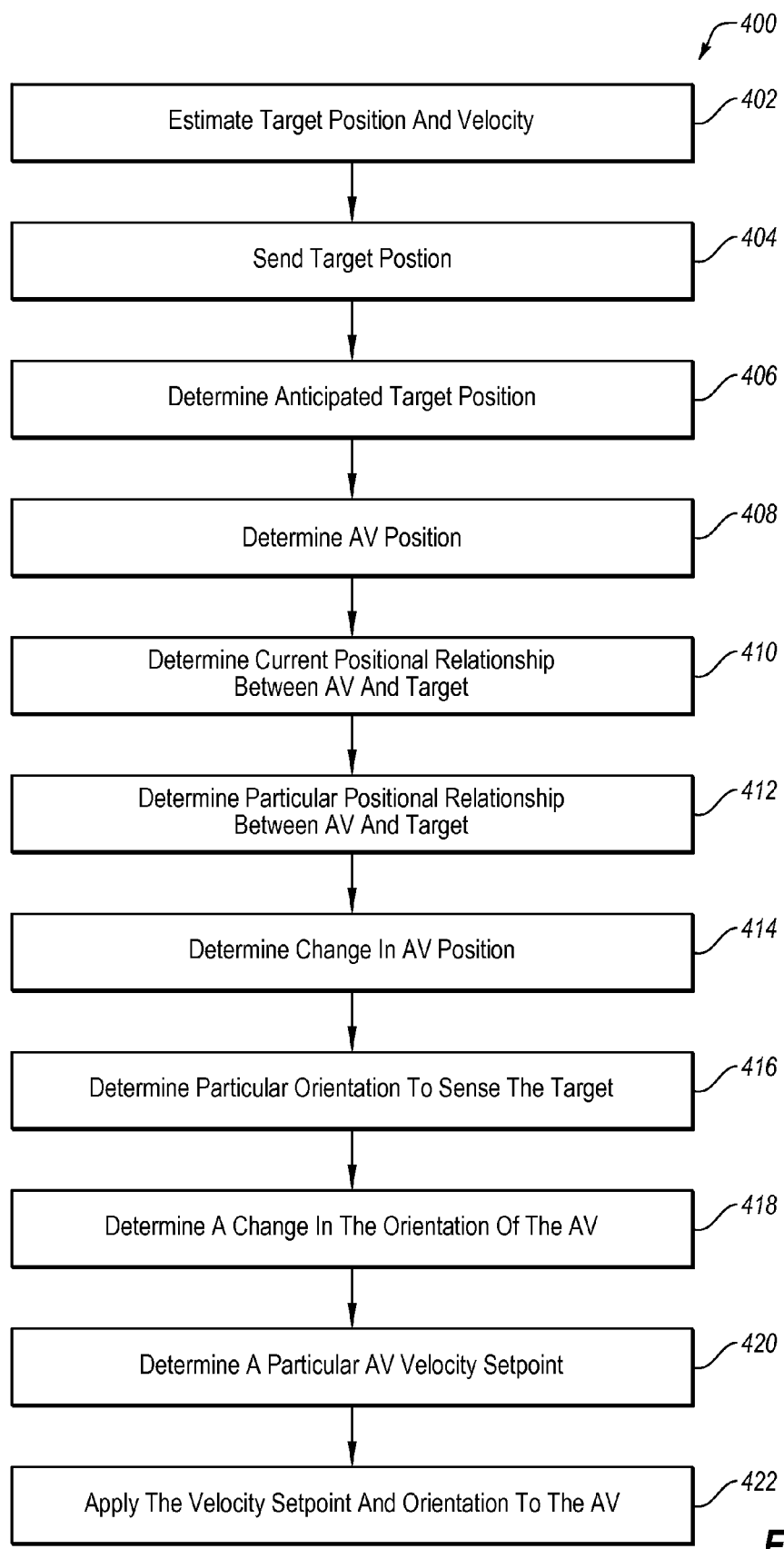
FIG. 4 is a flow chart of an example method of the first target following mode.

FIG. 4 is a flow chart of an example method 400 of the first target following mode, which may be arranged in accordance with at least one embodiment described in this disclosure. The method 400 may be implemented, in some embodiments, by a system, such as the system 100 or 200 of FIGS. 1 and 2. Although illustrated as discrete blocks, various blocks may be divided into additional blocks, combined into fewer blocks, or eliminated, depending on the desired implementation.

The method 400 may begin at block 402, where a current target position and velocity may be estimated by a motion tracking device associated with a target. In some embodiments, the current target position and velocity may be estimated based on target sensor readings collected by the motion tracking device.

In block 404, the current target position and velocity may be sent by the motion tracking device to an autonomous vehicle associated with the motion tracking device.

In block 406, an anticipated target position and velocity may be determined based on the received current target position and velocity. Because the target and thus the motion tracking device are moving and there is inherent latency in the data transfer between the motion tracking device and the autonomous vehicle, the received current target position and velocity may be a previous target position and velocity and not an actual current target position and velocity of the target. To compensate for the inherent latency in the data transfer, the autonomous vehicle may use target prediction techniques to determine the anticipated target position and velocity based on the current target position and velocity of the motion tracking device and/or previous target positions and velocities. For example, as illustrated in FIG. 3, the anticipated target position may be equal to (tpos+tvel*dt) where dt is the inherent latency in the data transfer between the motion tracking device and the autonomous vehicle.

In block 408, a current autonomous vehicle position may be estimated by the autonomous vehicle. In some embodiments, the current autonomous vehicle position may be estimated based on autonomous vehicle sensor readings collected by the autonomous vehicle. For example, as illustrated in FIG. 3, the current autonomous vehicle position may be the pos vector.

In block 410, a current positional relationship between the autonomous vehicle and the target may be determined. For example, as illustrated in FIG. 3, the current positional relationship between the autonomous vehicle and the target may be the coffs vector. In some embodiments, the coffs vector may equal pos−(tpos+tvel*dt).

In block 412, a particular positional relationship between the autonomous vehicle and the target may be determined. For example, as illustrated in FIG. 3, the particular positional relationship between the autonomous vehicle and the target may be the offs vector. In some embodiments, the offs vector may be calculated based on a particular positional relationship between the autonomous vehicle and the anticipated target position of the target. In some embodiments, the particular positional relationship between the autonomous vehicle and the target may account for path restriction data. In these and other embodiments, the particular positional relationship between the autonomous vehicle and the target may be compared to the path restriction data. When the particular positional relationship is in conflict with the path restriction data, the particular positional relationship may be adjusted such that the particular positional relationship is not in conflict with the particular path restriction data. Further examples regarding a particular positional relationship and the path restriction data is explained with respect to FIG. 9.

In block 414, a change in the position of the autonomous vehicle may be determined. The change in the position of the autonomous vehicle may be based on the particular positional relationship between the autonomous vehicle and the target and the current positional relationship between the autonomous vehicle and the target. For example, as illustrated in FIG. 3, a change in the position of the autonomous vehicle may be the poserror vector. The poserror vector may be equal to offs−coffs.

In block 416, a particular autonomous vehicle orientation and payload sensor orientation may be determined to allow the payload sensor to sense the target. The particular autonomous vehicle orientation and payload sensor orientation may be calculated based on the autonomous vehicle and payload sensor physical restrictions. In some embodiments, the autonomous vehicle body design and the payload sensor platform may have limited ranges of motion. As such, the autonomous vehicle orientation may be changed to accomplish a particular payload sensor orientation. For example, a camera with controllable pitch and roll angles may be mounted in the front side of a helicopter. As a result, the helicopter may yaw for the camera to aim at a target in a particular location outside the field of view of the camera through adjusting pitch and roll angles of the camera.

In block 418, a change in the orientation of the autonomous vehicle and the orientation of the payload sensor may be determined. The change in the orientation of the autonomous vehicle and the orientation of the payload sensor may be calculated based on the particular autonomous vehicle orientation and payload sensor orientation and the current autonomous vehicle orientation and payload sensor orientation.

In block 420, a particular autonomous vehicle velocity setpoint may be determined. The velocity setpoint may be based on the calculated change in the position of the autonomous vehicle. In some embodiments, to improve and/or decrease reaction time to movements of the target, the velocity setpoint may be adjusted by adding a proportion of the current target velocity tvel. Thus, a formula for a velocity setpoint velsp may be velsp=velsp+tvel*K, where K is a factor between 0 and 2. The K factor may be determined based on velocity of the target. For example, if the K is 1, then all of the target velocity is applied to the velocity setpoint such that the autonomous vehicle may mirror a velocity of the target. In these and other embodiments, the low-pass filtering may be applied to the target velocity tvel to reduce the velocity setpoint being based on errors or extreme changes in the target velocity.

In block 422, the particular autonomous vehicle velocity setpoint and the change in the orientation of the autonomous vehicle and the orientation of the payload sensor may be applied to the autonomous vehicle. In these and other embodiments, the particular autonomous vehicle velocity setpoint may change the motor speeds, motor angles, and other aspects of the autonomous vehicle to achieve the particular autonomous vehicle velocity setpoint.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. For example, block 422 may be performed before blocks 418 and 420.

FIG. 5 illustrates a second target following mode, which may be arranged in accordance with at least one embodiment described in this disclosure. In some embodiments, during the second target following mode, an autonomous vehicle may be configured to follow a target or trajectory of a target with a given offset while maintaining payload sensor fixed on the target. In these and other embodiments, the autonomous vehicle may follow the target by maintaining an approximate trajectory and velocity of the target. For example, a quadcopter drone may aim a camera at a target subject and follow the target subject's travel path with a delay while staying behind the subject on the path and keeping a particular distance between the subject and the quadcopter drone and keeping a particular altitude above the subject.

In some embodiments, the second target following mode may be configured such that the autonomous vehicle does not follow every path feature of a target. FIG. 5 illustrates a travel path 510 of a target and first, second, third, fourth, fifth, sixth, and seventh trajectory points 520a-520g, which are referred to collectively or generically as trajectory point(s) 520. During the second target following mode, a beginning of the travel path 510 is selected as a trajectory point 520. For example, as illustrated in FIG. 5, the beginning of the travel path 510 is selected as the first trajectory point 520a.

Each of the trajectory points 520 includes an acceptance circle 530 which includes an acceptance radius 540. FIG. 5 illustrates a first, second, third, fourth, fifth, sixth, and seventh acceptance circles 530a-530g that correspond with first, second, third, fourth, fifth, sixth, and seventh trajectory points 520a-520g. The first, second, third, fourth, fifth, sixth, and seventh acceptance circles 530a-530g may be referred to collectively or generically as acceptance circle(s) 530. In some embodiments, the acceptance radius 540 may be configurable based on a user input or variables determined by the autonomous vehicle. For example, in some embodiments, the acceptance radius 540 may be determined based on a velocity of the target, an activity of the user, or based on some other factor. For example, the acceptance radius 540 may be larger when the velocity of a target is larger and smaller when the velocity of the target is smaller.

In some embodiments, the acceptance radius 540 of an acceptance circle 530 may be the same or different than the acceptance radius 540 of other acceptance circles 530. For example, as a velocity of a target changes along the travel path 510, the acceptance radius 540 of different acceptance circles 530 may also change. For example, the acceptance radius 540 of the first acceptance circle 530a may be larger than the acceptance radius 540 of the second acceptance circle 530b.

In some embodiments, a next trajectory point 520 may be selected when a target crosses the acceptance circle 530 of the current trajectory point 520. The next trajectory point 520 may be the location at which the target crosses the acceptance circle 530. For example, the second trajectory point 520b is selected as the location that the travel path 510 crosses the first acceptance circle 530a of the first trajectory point 520a.

A trajectory path 550 of the autonomous vehicle may be approximately straight lines between the trajectory points 520. As illustrated in FIG. 5, the trajectory path 550 may not include all of the path features of the travel path 510 of the target, but the trajectory path 550 may follow the travel path 510 of the target. Thus, in some embodiments, the second target following mode may filter out some less relevant or irrelevant path features and follow significant path features.

In some embodiments, a motion tracking device associated with the target may be configured to determine the trajectory points 520. In these and other embodiments, the motion tracking device may send the trajectory points 520 to the autonomous vehicle and the autonomous vehicle may follow the trajectory path 550 without knowledge of the travel path 510. In these and other embodiments, the motion tracking device determining the trajectory points 520 may reduce data transfer between the motion tracking device and the autonomous vehicle. Alternately or additionally, the motion tracking device determining the trajectory points 520 may increase accuracy of positional data provided by the motion tracking device to the autonomous vehicle.

In some embodiments, the autonomous vehicle may be configured to determine the trajectory points 520. In these and other embodiments, determining the trajectory points 520 may reduce a number of adjustments applied to the velocity and/or an amount of data and calculations used to adjust the velocity of the autonomous vehicle to follow the target. Modifications, additions, or omissions may be made to the second target following mode without departing from the scope of the present disclosure.

Figure 6:
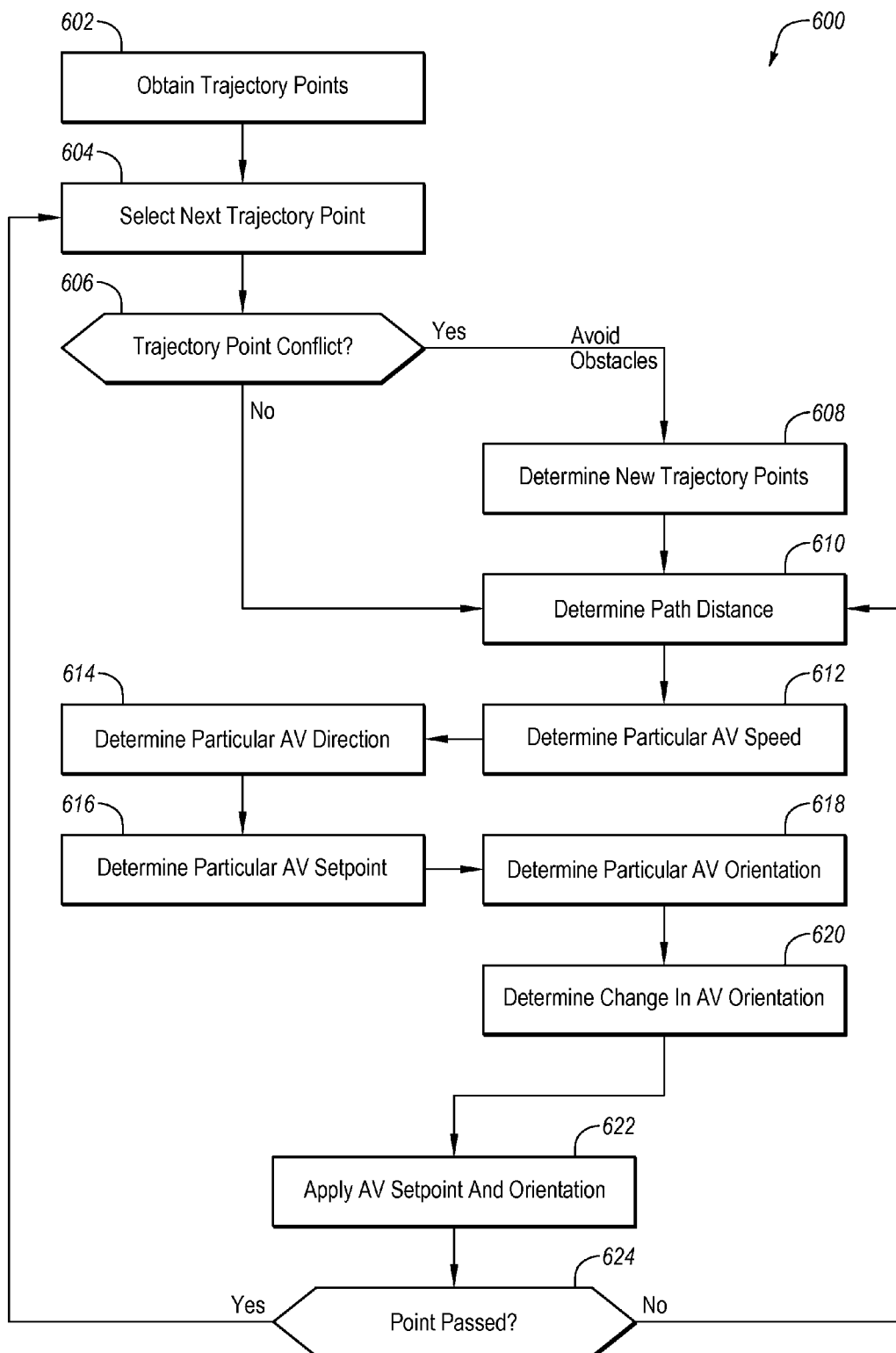
FIG. 6 is a flow chart of an example method of the second target following mode.

FIG. 6 is a flow chart of an example method 600 of the second target following mode, which may be arranged in accordance with at least one embodiment described in this disclosure. The method 600 may be implemented, in some embodiments, by a system, such as the system 100 or 200 of FIGS. 1 and 2. Although illustrated as discrete blocks, various blocks may be divided into additional blocks, combined into fewer blocks, or eliminated, depending on the desired implementation.

The method 600 may begin at block 602, where trajectory points may be obtained. The trajectory points may be obtained by calculating the trajectory points or by receiving the trajectory points from a motion tracking device.

In block 604, a next trajectory point to visit may be selected. For example, as illustrated in FIG. 5, there may be multiple trajectory points. In these and other embodiments, an autonomous vehicle may be one or more trajectory points behind the target depending on a particular offset distance between the autonomous vehicle and the target, a changing velocity of the target, and/or an acceptance radius. In these and other embodiments, a trajectory point that immediately follows the current trajectory point obtained may be selected as the next trajectory point.

If there is not a next trajectory point, for example, if target has been circling the next trajectory point, the method 600 may wait at block 604 for the next trajectory point. In these and other embodiments, the autonomous vehicle may maintain in a particular location and track the target with the sensor payload. Alternately or additionally, while waiting for the next trajectory point, the autonomous vehicle may adhere to the first target following mode or some other target following mode and may track the target within the current acceptance circle.

In block 606, it may be determined if the next trajectory points conflict with path restriction data. When it is determined that the next trajectory points conflicts with the path restriction data, the method 600 may proceed to block 608. When it is determined that the next trajectory points does not conflict with the path restriction data, the method 600 may proceed to block 610.

In block 608, one or more new next trajectory points may be determined. The new next trajectory points may be determined that do not conflict with the path restriction data. The new next trajectory points may be configured to avoid conflicts with the path restriction data. Avoiding conflicts with the path restriction data may indicate that the autonomous vehicle operates to avoid an obstacle or no travel area. Additional disclosure regarding selecting the new next trajectory points is provided with respect to FIG. 9.

Figure 7:
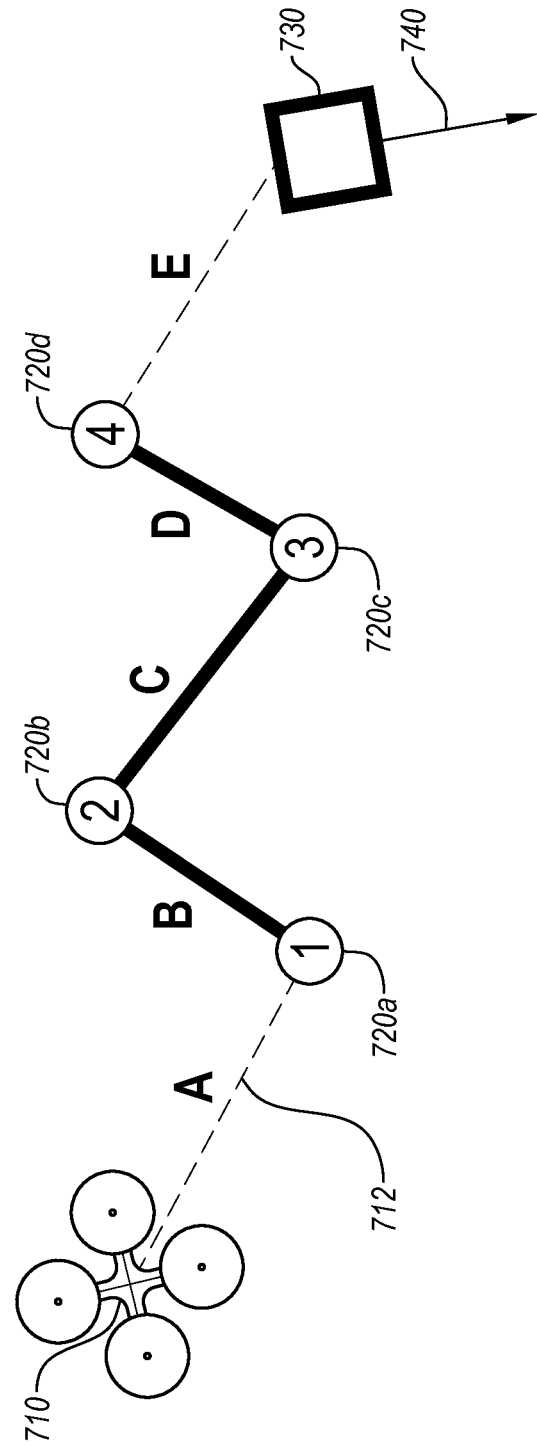
FIG. 7 illustrates path distance calculation for the second target following mode.

In block 610, a path distance between the autonomous vehicle and the target may be determined. In some embodiments, the path distance may be determined based on a number of trajectory point between the target and the autonomous vehicle. In some embodiments, the path distance may be determined based on a sum of minimal distances between adjacent trajectory points. An example of a path distance calculation may be determined as illustrated in FIG. 7.

In block 612, a particular autonomous vehicle speed may be determined. In some embodiments, the particular autonomous vehicle speed may be determined based on user configuration parameters. In these and embodiments, the user configuration parameters may include a selected path distance between the autonomous vehicle and the target, a desired altitude of the autonomous vehicle, acceleration and/or braking capabilities of the autonomous vehicle, current position of the autonomous vehicle, the position of the next trajectory point, follow path gate width, among others.

In some embodiments, a distance error between the autonomous vehicle and the target may be determined. The distance error may be equal to a difference between the path distance between the autonomous vehicle and the target and a user or system selected path distance between the autonomous vehicle and the target. In these and other embodiments, the distance error may be passed to a PID controller that is configured to increase or decrease the speed of the autonomous vehicle.

In block 614, a particular autonomous vehicle direction may be determined. In some embodiments, the particular autonomous vehicle direction may be a direction that leads to the next trajectory point.

In block 616, a particular autonomous vehicle velocity setpoint may be calculated. The velocity setpoint may be based on the particular autonomous vehicle speed and the particular autonomous vehicle direction.

In block 618, a particular autonomous vehicle orientation and payload sensor orientation may be determined to allow the payload sensor to sense the target. The particular autonomous vehicle orientation and payload sensor orientation may be calculated based on the autonomous vehicle and payload sensor physical restrictions. In some embodiments, the autonomous vehicle body design and the payload sensor platform may have limited ranges of motion. As such, the autonomous vehicle orientation may be changed to accomplish a particular payload sensor orientation. For example, a camera with controllable pitch and roll angles may be mounted in the front side of a helicopter. As a result, the helicopter may yaw for the camera to aim at a target in a particular location outside the field of view of the camera through adjusting pitch and roll angles of the camera.

In block 620, a change in the orientation of the autonomous vehicle and the orientation of the payload sensor may be determined. The change in the orientation of the autonomous vehicle and the orientation of the payload sensor may be calculated based on the particular autonomous vehicle orientation and payload sensor orientation and the current autonomous vehicle orientation and payload sensor orientation.

In block 622, the particular autonomous vehicle velocity setpoint and the change in the orientation of the autonomous vehicle and the orientation of the payload sensor may be applied to the autonomous vehicle. In these and other embodiments, the particular autonomous vehicle velocity setpoint and the change in the orientation of the autonomous vehicle and the orientation of the payload sensor may change the motor speeds, motor angles, and other aspects of the autonomous vehicle to achieve the particular autonomous vehicle velocity setpoint and the change in the orientation of the autonomous vehicle and the orientation of the payload sensor.

In block 624, it may be determined if the next trajectory point selected in block 604 has been passed by the autonomous vehicle. When the next trajectory point selected in block 604 has been passed by the autonomous vehicle, the method 600 may proceed to block 604 to select another next trajectory point. When the next trajectory point selected in block 604 has not been passed by the autonomous vehicle, the method 600 may proceed to block 610 to adjust the velocity of the autonomous vehicle. In some embodiments, the method 600 may wait for a period before proceeding to block 610 to adjust the velocity of the autonomous vehicle.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

FIG. 7 illustrates path distance calculation for the second target following mode, which may be arranged in accordance with at least one embodiment described in this disclosure. FIG. 7 illustrates a future travel path 712 of an autonomous vehicle along first, second, third, and fourth trajectory points 720a-720d, which are referred to collectively or generically as trajectory point(s) 720. The autonomous vehicle may be located at a current autonomous vehicle location 710 and the target may be a target location 730 with a target velocity 740.

In some embodiments, a path distance between the autonomous vehicle and the target may be determined, For example, a path distance may be a distance between the current autonomous vehicle location 710 and a target location 730. In these and other embodiments, the path distance may be a sum of the distances between the different trajectory points 720. For example, the distance between the current autonomous vehicle location 710 may be A. The distance between the remaining trajectory points 720 may be B, C, D, and E, as illustrated in FIG. 7. Thus, the path distance may be a sum of the distances A, B, C, D, and E. In some embodiments, the distances A, B, C, D, and E may be the shortest distances between the trajectory points 720.

Figure 8:
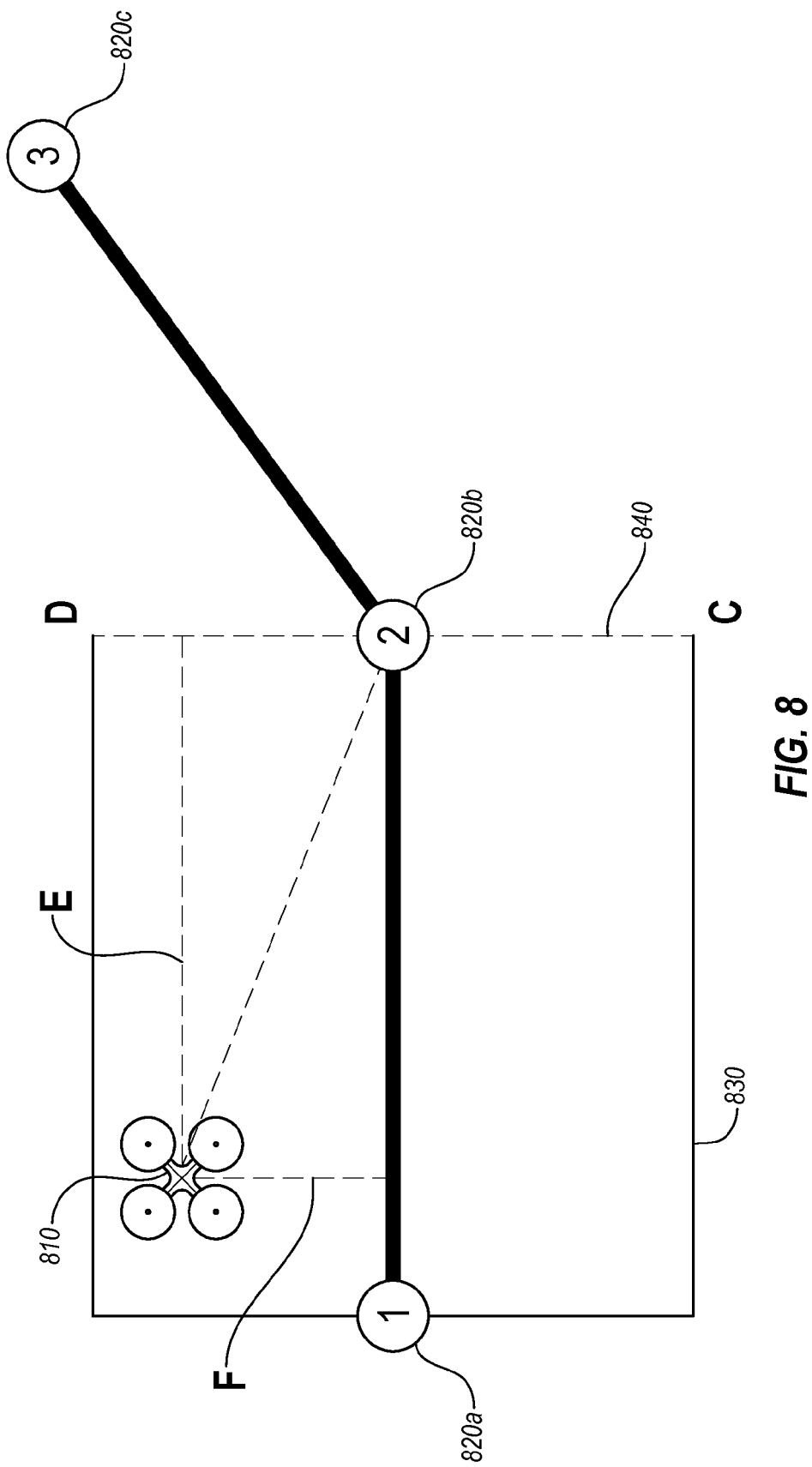
FIG. 8 illustrates a method to determine when a trajectory point has been reached.

FIG. 8 illustrates a method to determine when a trajectory point has been reached, which may be arranged in accordance with at least one embodiment described in this disclosure. The method may be used for the second target following method. For example, the method may be used to determine if a next trajectory point has been passed by an autonomous vehicle as described in block 624 of FIG. 6.

For example, FIG. 8 illustrates a position 810 of an autonomous vehicle. FIG. 8 also illustrates first, second, and third trajectory points 820a-820c, a follow path corridor 830, and a follow path gate 840. The first, second, and third trajectory points 820a-820c may be referred collectively or individually as the trajectory point(s) 820. The trajectory points 820 may result from the autonomous vehicle performing the second target follow mode or some other mode that results in trajectory points 820. In some embodiments, the trajectory points 820 may be determined in a manner as described with respect to FIG. 5.

The follow path corridor 830 may be a parallelogram that wraps a trajectory segment between two adjacent trajectory points 820. In particular, the follow path corridor 830 is a parallelogram that wraps a trajectory segment between the first and second trajectory points 820a and 820b. The follow path corridor 830 may have a follow path gate 840 at the second trajectory point 820b, defined as the location between points C and D. The width of the follow path gate 840 may be selectable by a user or set by the system.

Two distances F and E based on the follow path corridor 830 may be used to determine when the autonomous vehicle has passed by or may be considered to have passed the second trajectory point 820b when traveling from or near the first trajectory point 820a. The distance F may be a shortest distance from the position 810 to a straight trajectory line between the first and second trajectory points 820a and 820b. The distance E may be a shortest distance from the position 810 to the follow path gate 840.

The autonomous vehicle may be considered to have passed the second trajectory point 820b when both of the distances F and E are less than their corresponding particular distances as determined by configuration parameters that may be set by a user or by a system that includes the autonomous vehicle. The particular distances may be selected based on actions being performed by the target and/or other factors. In some embodiments, the bigger the values of the particular distances the trajectory of the autonomous vehicle is less precise. Alternately or additionally, the bigger the values of the particular distances, the trajectory of the autonomous vehicle is less adhering to the trajectory points but more smooth than when smaller values are used for the particular distances.

Figure 9:
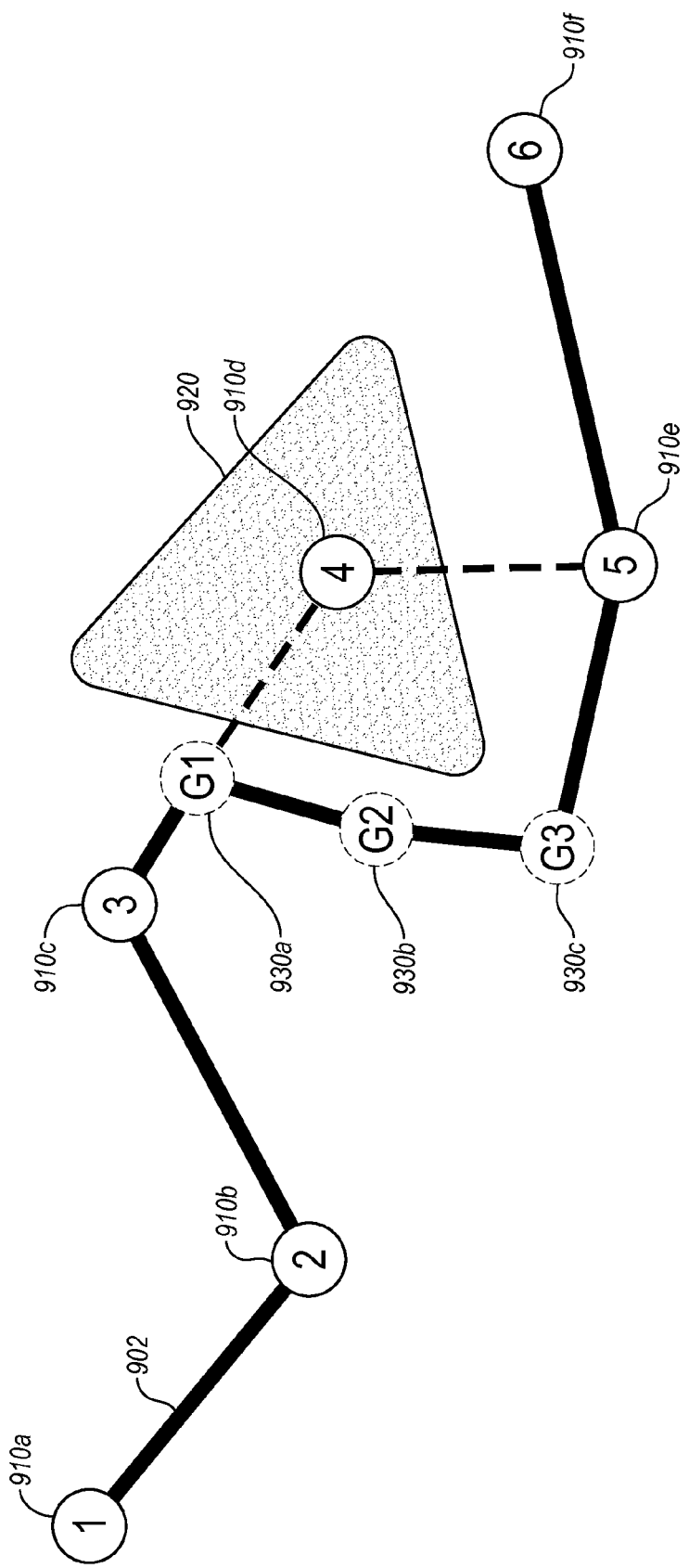
FIG. 9 illustrates an obstacle avoidance method.

FIG. 9 illustrates an obstacle avoidance method, which may be arranged in accordance with at least one embodiment described in this disclosure. FIG. 9 illustrates a travel path 902 of an autonomous vehicle along first, second, third, fourth, fifth, and sixth trajectory points 910a-910f, which are referred to collectively or generically as trajectory point(s) 910. The travel path 902 may have a conflict with an obstacle 920. In particular, the fourth trajectory point 910d may be located in the obstacle. As a result, the autonomous vehicle may be unable or should not navigate to the fourth trajectory point 910d. As a result, when the autonomous vehicle determines that there is a conflict, the autonomous vehicle or some other component or device, may determine first, second, and third alternate trajectory points 930a-930c around the obstacle 920. The first, second, and third alternate trajectory points 930a-930c may be referred to collectively or generically as alternate trajectory point(s) 930.

In some embodiments, the alternate trajectory point(s) 930 may be selected based on a shortest route around the obstacle. Alternately or additionally, the alternate trajectory point(s) 930 may be selected based on a route that maintains a minimum distances between the autonomous vehicle and the target or travel path 902 while maintaining the autonomous vehicle outside of the obstacle 920. In these and other embodiments, the minimum distances may be a minimum distances that is equal to or larger than a particular offset distance that may be maintained between the autonomous vehicle and the target when there is not a course correction for an obstacle.

Figure 10:
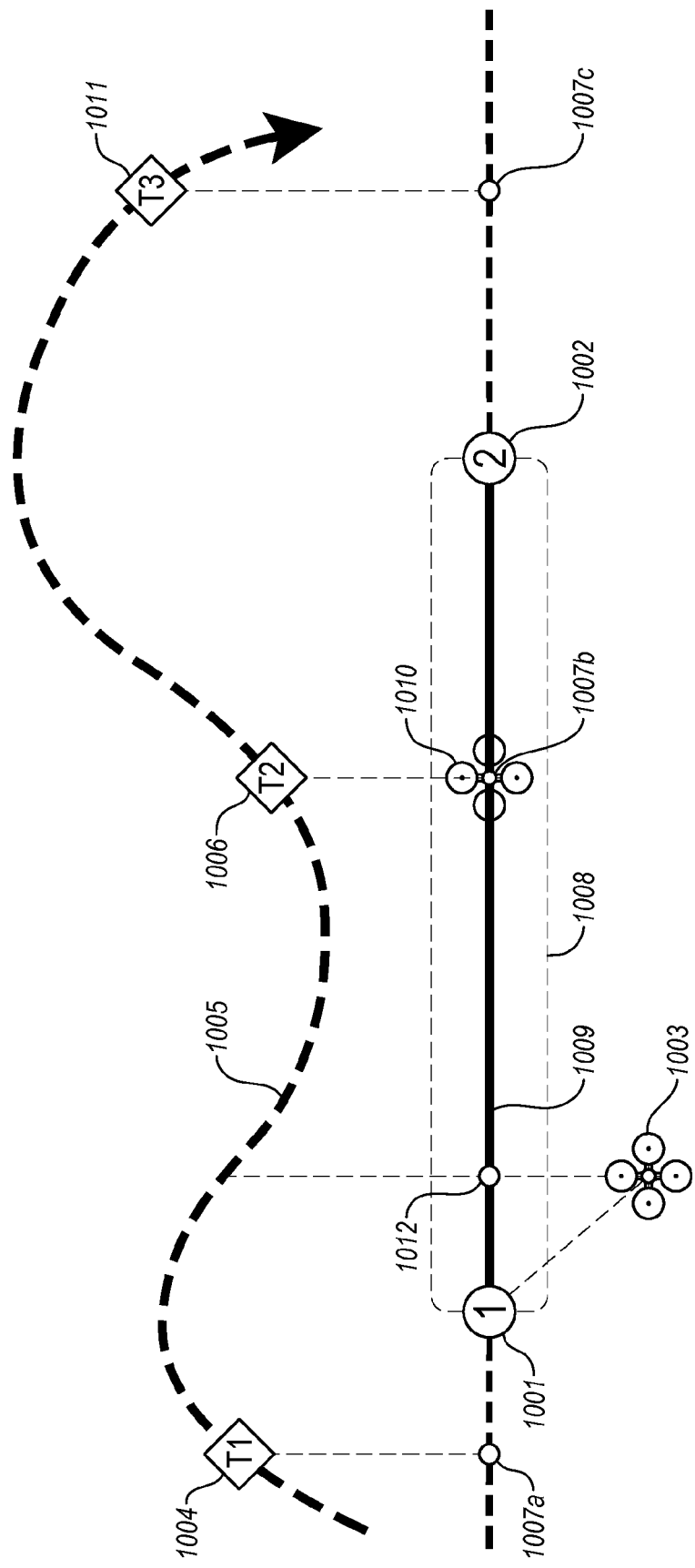
FIG. 10 illustrates an example of a first sub-mode of a third target following mode.

FIG. 10 illustrates an example of a first sub-mode of a third target following mode, which may be arranged in accordance with at least one embodiment described in this disclosure. In some embodiments, in the first sub-mode of the third target following mode, an autonomous vehicle may maintain a position as close to a target as possible and aim a sensor payload at a target while staying on a predefined line between two end locations. The first sub-mode of the third target following mode may determine a position of the autonomous vehicle and direction of travel along the predefined line with respect to a location of the target. In some embodiments, a user or system may define the predefined line and the two end locations. In some embodiments, the mode may include a corridor around the predefined line in which the autonomous vehicle may operate instead of directly along the predefined line. In some embodiments, a graphical map or satellite image may be used in a user interface to more easily allow a user to select the two end locations and the predefined line.

FIG. 10 illustrates an initial target position 1004, a target travel path 1005, an intermediate target position 1006, final target position 1011, a first set location 1001, a second set location 1002, an initial autonomous vehicle position 1003, an initial autonomous vehicle position projection 1012, a predefined line 1009 between the first and second set locations 1001 and 1002, an intermediate autonomous vehicle position 1010, a corridor boundary 1008, an initial, intermediate, and final target position projections 1007a-1007c, referred to herein collectively or individually as target position projections 1007. Note that the target position projections 1007 are locations along a line that extends through the first and second set locations 1001 and 1002 that are in lines perpendicular to the predefined line 1009 that include the target positions. For example, the initial target position projection 1007a may be a point that is a shortest distance between a line that extends between the first and second set locations 1001 and 1002 and the initial target position 1004.

FIG. 10 is a two-dimensional diagram model. However, the first sub-mode of the third target following mode may be used in three-dimensions. In these and other embodiments, the third dimension may be an altitude above the ground or below a water level. In these and other embodiments, the positions described with respect to FIG. 10 may be three-dimensional positions and the corridor boundary 1008 may be a three-dimensional boundary. The first sub-mode of a third target following mode is further described below with respect to FIG. 11.

Figure 11:
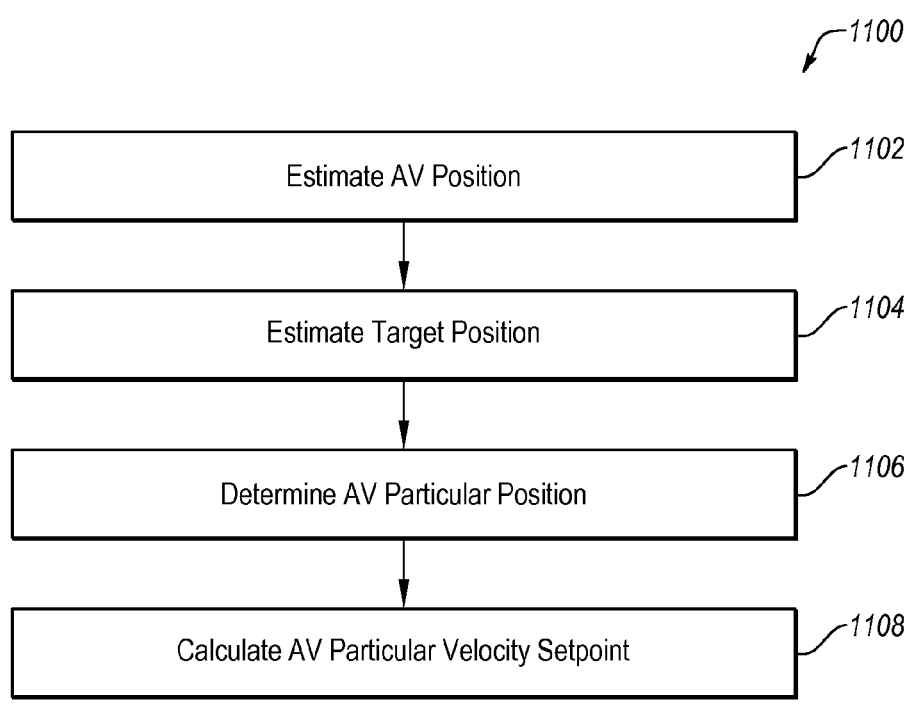
FIG. 11 is a flow chart of an example method of the first sub-mode of the third target following mode.

FIG. 11 is a flow chart of an example method 1100 of the first sub-mode of the third target following mode, which may be arranged in accordance with at least one embodiment described in this disclosure. The method 1100 may be implemented, in some embodiments, by a system, such as the system 100 or 200 of FIGS. 1 and 2. Although illustrated as discrete blocks, various blocks may be divided into additional blocks, combined into fewer blocks, or eliminated, depending on the desired implementation.

The method 1100 may begin at block 1102, where a position of an autonomous vehicle may be estimated. In some embodiments, the current autonomous vehicle position may be estimated based on autonomous vehicle sensor readings collected by the autonomous vehicle.

In block 1104, a position of the target may be estimated. In some embodiments, a motion tracking device associated with a target may be used to estimate the position of the target. In some embodiments, the position of the target may be estimated based on target sensor readings collected by the motion tracking device. Alternately or additionally, the position of the target may be estimated by the autonomous vehicle. In some embodiments, a target position projection of the target may be determined based on the position of the target.

In block 1106, a particular position of the autonomous vehicle may be determined. The particular position of the autonomous vehicle may be based on the position of the autonomous vehicle, the position of the target, and a corridor boundary associated with a particular line along which the autonomous vehicle is configured to operate during the first sub-mode of the third target following mode. The particular line may be defined by two set locations. A particular position may be determined differently based on the position of the autonomous vehicle and the position of the target. A description of how to determine the particular position of the autonomous vehicle is described with respect to FIG. 10.

To determine the particular position, it is first determined if the autonomous vehicle is within the corridor boundary. For example, the initial autonomous vehicle position 1003 is outside of the corridor boundary 1008. When the autonomous vehicle is outside the corridor boundary, the particular position of the autonomous vehicle is a projection of the position of the autonomous vehicle on the corridor boundary or particular line. For example, the particular position of the autonomous vehicle may be the initial autonomous vehicle position projection 1012.

If the autonomous vehicle is within the corridor boundary, then it may be determined if the target position projection along the particular line is between the first and second set locations. For example, the intermediate target position projection 1007b is between the first and second set locations 1001 and 1002. In contrast, the initial and final target position projections 1007a and 1007c are not along the predefined line 1009 line that is between the first and second set locations 1001 and 1002. When the target position projection along the predefined line 1009 is between the first and second set locations 1001 and 1002, then the particular position of the autonomous vehicle is the target position projection. For example, as illustrated in FIG. 10, the intermediate autonomous vehicle position 1010 may be the same as the intermediate target position projections 1007b.

If the target position projection is not along the particular line between the first and second set locations, then the particular position of the autonomous vehicle is the one of the first and second set locations closest to the target position. For example, when the target is in the initial target position 1004, the particular position may be the first set location 1001 and when the target is in the final target position 1011, the particular position may be the second set location 1002.

In some embodiments, the method 1100 may not include a corridor boundary. In these and other embodiments, the particular line may be used in place of the corridor boundary to determine the particular position.

In block 1108, a particular velocity setpoint of the autonomous vehicle may be determined. In some embodiments, the particular velocity setpoint may be determined based on a distance between the location of the autonomous vehicle and the particular position of the autonomous vehicle. In these and other embodiments, the particular velocity setpoint may also be determined based on configuration parameters of the autonomous vehicle.

In some embodiments, to improve and/or decrease reaction time to movements of the target, the velocity setpoint may be adjusted by adding a proportion of the current target velocity tvel that may be projected on the particular line. For example, a vector of the current target velocity tvel that is parallel to the particular line. Thus, a formula for the velocity setpoint velsp may be velsp=velsp+project(tvel)*K, where K is a factor between 0 and 2 and project(tvel) is the proportion of the current target velocity tvel that may be projected on the particular line. The K factor may be determined based on velocity of the target. For example, if the K is 1, then all of the target velocity is applied to the velocity setpoint such that the autonomous vehicle may mirror a velocity of the target. In these and other embodiments, the low-pass filtering may be applied to the target velocity tvel to reduce the velocity setpoint being based on errors or extreme changes in the target velocity.

In some embodiments, to increase a smoothness of braking by the autonomous vehicle when the autonomous vehicle is approaching a set location, a speed limiting factor may be applied when the particular velocity setpoint of the autonomous vehicle is determined. In these and other embodiments, a braking distance (bdist) may be defined in the configuration parameters of the autonomous vehicle. When the autonomous vehicle is closer to a set location than a braking distance and is moving toward the set location, then the velocity set point may be adjusted proportionally to the distance to the set location. For example, the proportionality may be defined by the following equation, velsp=velsp*(1−(bdist−dist_to_sl)/bdist), where dist_to_sl is the distance to the set location from the autonomous vehicle.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 1100 may further include determining a particular autonomous vehicle and sensor payload orientation, determining changes for velocity and orientation, and applying the changes to the applied to the autonomous vehicle. In these and other embodiments, this may be analogous to the operations/steps performed with respect to other methods discussed herein. In some embodiments, the method 1100 may repeat such that after applying the changes to the applied to the autonomous vehicle, the method 1100 may return to block 1102.

Figure 12:
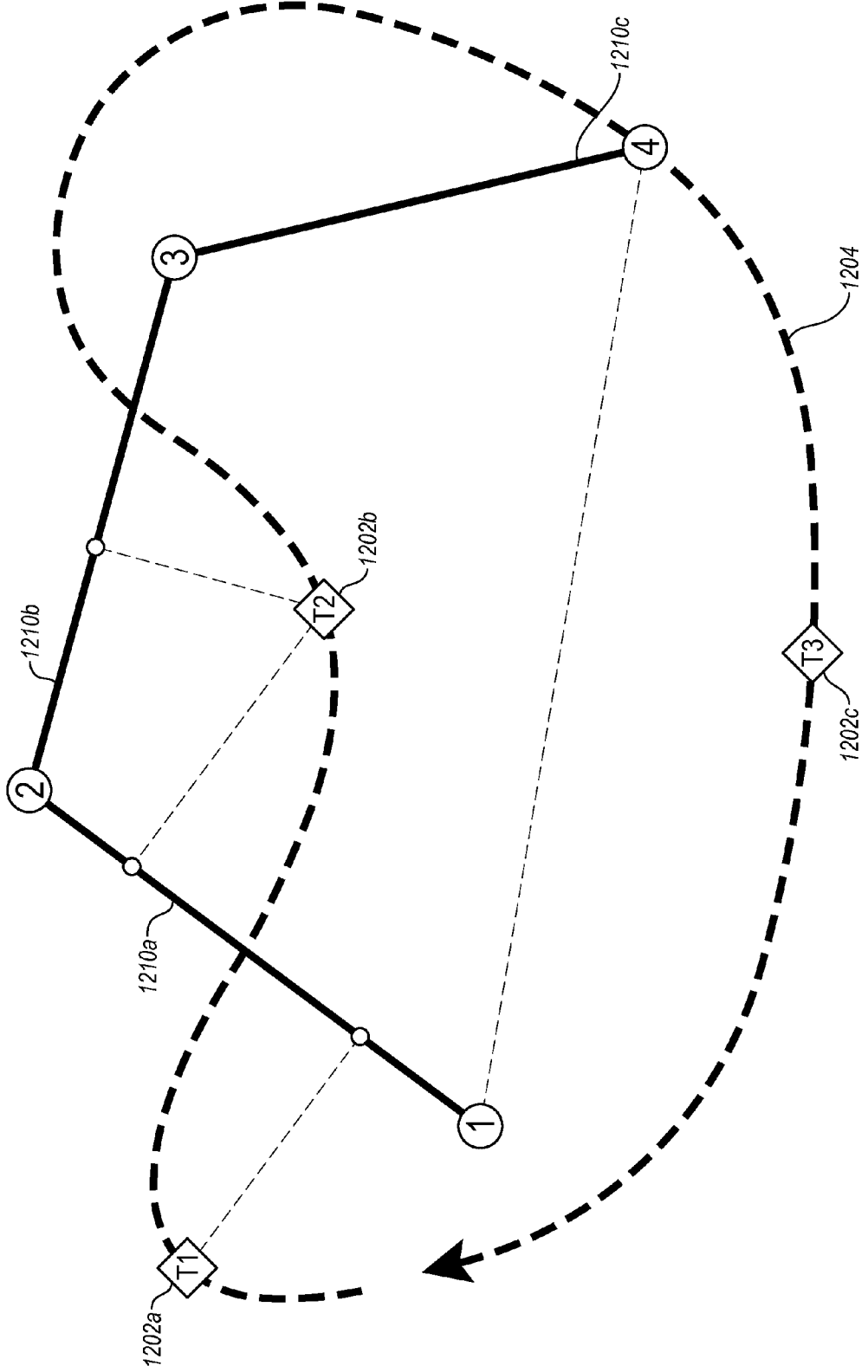
FIG. 12 illustrates an example of a second sub-mode of the third target following mode.

FIG. 12 illustrates an example of a second sub-mode of the third target following mode, which may be arranged in accordance with at least one embodiment described in this disclosure. In some embodiments, the second sub-mode of the third target following mode may direct an autonomous vehicle to maintain a position as close to a target as possible and aim a sensor payload at a target while staying on a multiple connected predefined lines between multiple end locations. The second sub-mode of the third target following mode may determine a position of the autonomous vehicle and direction of travel along the connected predefined lines with respect to a location of the target. In some embodiments, a user or system may define the multiple predefined lines and the multiple end locations. In some embodiments, the mode may include a corridor around one or more or all of the predefined lines in which the autonomous vehicle may operate instead of directly along the predefined lines. In some embodiments, a graphical map or satellite image may be used in a user interface to more easily allow a user to select the multiple end locations and the predefined lines.

For example, FIG. 12 illustrates first, second, and third lines 1210a-1210c, referred to collectively or individually as line(s) 1210, that are formed by first, second, third, and fourth set locations. FIG. 12 further illustrates a target path 1204 and first, second, and third target locations 1202a-1202c.

The second sub-mode of the third target following mode may operate in a similar manner as the first sub-mode of the third target following mode, except as explained below. In the second sub-mode, the location of the target may be projected onto each of the lines 1210 if possible. Thus, the target in the first position 1202a may be projected on the first line 1210a, the target in the second position 1202b may be projected on the first, second, and third lines 1210a-1210c, and the target in the third position 1202c may be projected on the second line 1210b.

Generally, the autonomous vehicle may move along the lines 1210 to the projection that is the closest to the target. For example, in the second position 1202b, the target is the closest to the projection along the second line 1210b. Accordingly, the autonomous vehicle may move to the location of the projection of the target along the second line 1210b.

In some embodiments, if projection of the target does not intersect with one of the lines 1210 then the distance for that line 1210 is determined based on the distance between the target and the set location that forms part of the line that is closest to the target. For example, the second line 1210b may not have a projection of the target when the target is in the first position 1202a. Accordingly, the second set location may be selected and a distance between the second set location and the target may be determined as the distance for the second line 1210b. In these and other embodiments, if the distance from a set location is closer than a projection distance, the autonomous vehicle may move to the set location.

When the autonomous vehicle is not on one of the lines 1210, the autonomous vehicle may move to the closest line or set location and then begin tracking the target as defined above. When the projection or the particular position of the autonomous vehicle is not along the line 1210 where the autonomous vehicle is currently located, the autonomous vehicle, in some embodiments, may move directly to that location. Alternately or additionally, the autonomous vehicle may move along the different lines to the location. For example, if the autonomous vehicle is on the third line 1210c and the particular position of the autonomous vehicle moves to the first line 1210a, the autonomous vehicle may move from the third line 1210c, to the second line 1210b, and then to the first line 1210a and not directly from the third line 1210c to the first line 1210a. Modifications, additions, or omissions may be made to the third target following mode without departing from the scope of the present disclosure. For example, additional lines may be added. In these and other embodiments, the lines may form a closed polynomial. Alternately or additionally, corridor boundaries may surround each of the lines 1210.

Figure 13:
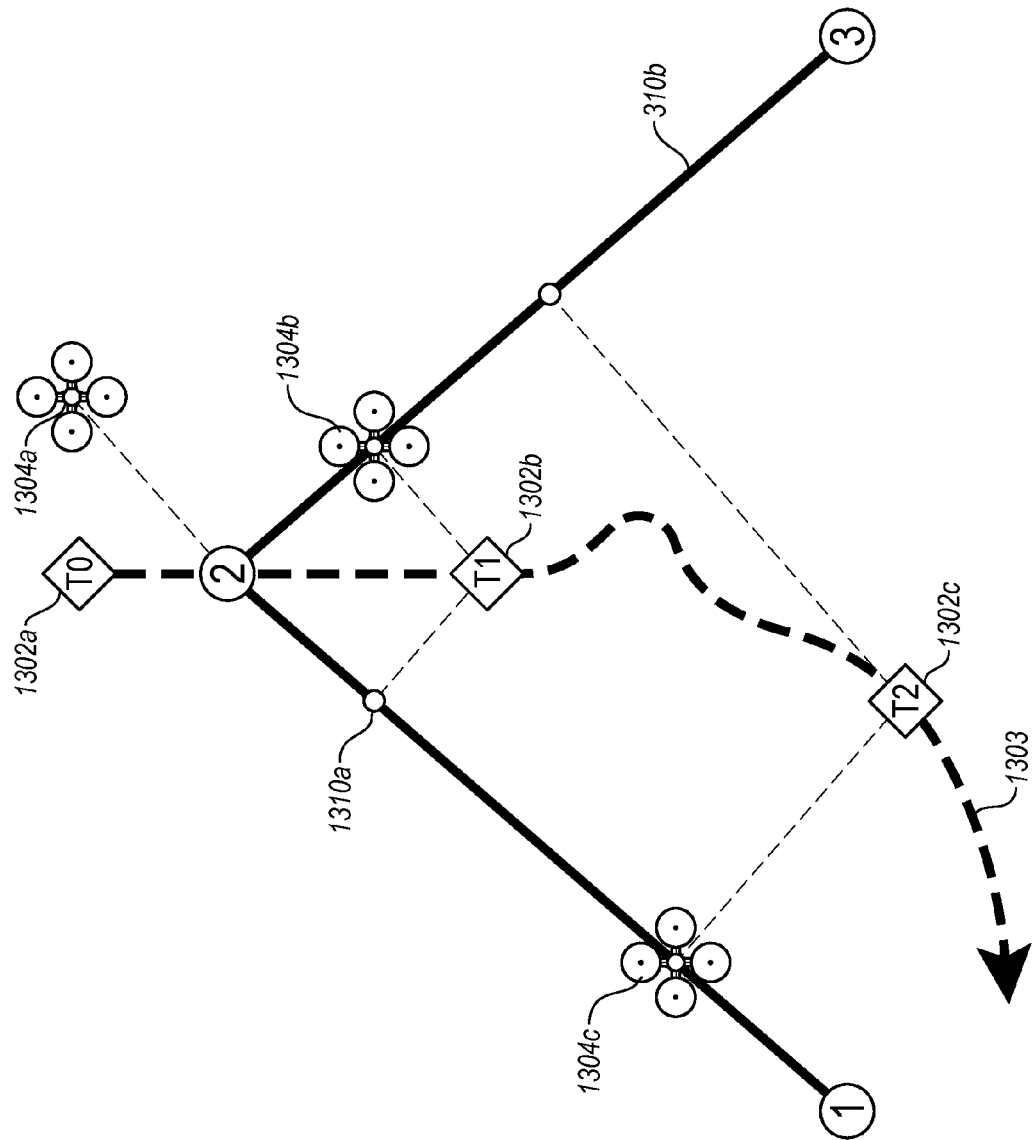
FIG. 13 illustrates another example of the second sub-mode of the third target following mode.

FIG. 13 illustrates another example of the second sub-mode of the third target following mode, which may be arranged in accordance with at least one embodiment described in this disclosure. FIG. 13 illustrates first and second lines 1310a and 1310b, referred to collectively or individually as line(s) 1310, that are formed by first, second, and third, set locations. FIG. 13 further illustrates a target path 1303, first, second, and third target locations 1302a-1302c, and first, second, and third autonomous vehicle locations 1304a-1304c.

As illustrated in FIG. 13, a special case may occur when the target is initially travelling at the same distance between two lines 1310. For example, when the target travels from the first target location 1302a to the second target locations 1302b then it is equally close to the first line 1310a and the second line 1310b. With the autonomous vehicle initially selecting the second line 1310b based on the second line 1310b being closer to the first autonomous vehicle location 1304a, the autonomous vehicle may continue on the second line 1310*b* to the second autonomous vehicle location 1304*b* when the target is at the second target location 1302*b*. However, when the target moves to the third target position 1302*c*, the autonomous vehicle maintains on the second line 1310*b* along the projection of the third target position 1302*c* along the second line 1310*b*. However, the autonomous vehicle along the second line 1310*b* places the autonomous vehicle far out of position due to the configuration of the lines 1310 and the target path 1303. In particular, due to the target path 1303, the target is much closer to the third autonomous vehicle location 1304*c* moving along the first line 1310*a* than any position along the second line 1310*b*. In these and other embodiments, with similar configurations the autonomous vehicle may deviate from the normal operation of the second sub-mode of a third target following mode to adjust its position from the second line 1310*b* to the third autonomous vehicle location 1304*c*.

In some embodiments, the deviation may be selected based on operation parameters of the autonomous vehicle. In these and other embodiments, the deviations from the normal operation of the second sub-mode of a third target following mode may include all three deviations, among others. The deviations may be used together or separately, or not at all.

In a first deviation, the autonomous vehicle may switch between lines 1310 when the position of the target so dictates and when the autonomous vehicle is located at a set location that joins the lines 1310. The position of the target may so dictate when the position of the target is such that the configuration of the lines 1310 with respect to the target path 1303 is such that the autonomous vehicle selects between two lines of equal spacing initially but selects a line 1310 that deviates further from the target path 1303 than another of the lines 1310.

In a second deviation, the autonomous vehicle may switch between lines 1310 when the position of the target so dictates and regardless of the current location of the autonomous vehicle. For example, the autonomous vehicle may switch between lines 1310 even when the autonomous vehicle is not at the joint of two lines. In these and other embodiments, the autonomous vehicle may follow the lines 1310 to switch between the lines 1310.

In a third deviation, the autonomous vehicle may be configured to switch between the lines 1310 based on a relationship between a first distance between the target and another line, a second distance between the target and the current position of the autonomous vehicle, and a third distance along the lines 1310 that the autonomous vehicle may traverse to move from the current line and a position to the appropriate position along the other line. In these and other embodiments, a difference between the first and second distances may be compared to the third distance. A distance between the first and second distances may represent how much closer the autonomous vehicle may be to the target once repositioned. The third distance may represent a travel distance of the autonomous vehicle. In some embodiments, when the difference between the first and second distances is greater than a first threshold and the difference between the first and second distances is above a threshold percentage of the third distance, the autonomous vehicle may be configured to switch between the lines 1310. Modifications, additions, or omissions may be made to the third target following mode without departing from the scope of the present disclosure.

Figure 14:
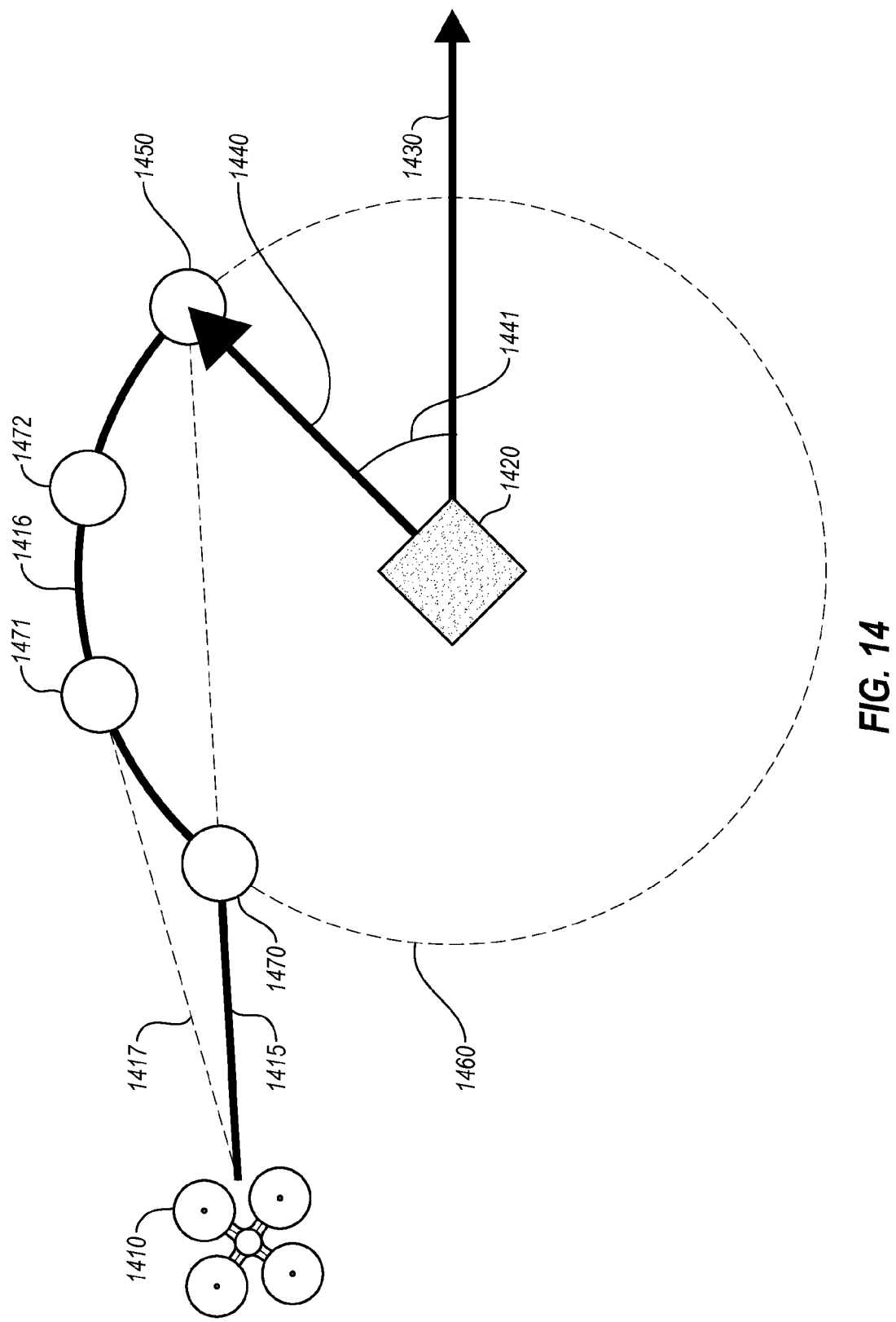
FIG. 14 illustrates an example of a fourth target following mode.

FIG. 14 illustrates an example of a fourth target following mode, which may be arranged in accordance with at least one embodiment described in this disclosure. In some embodiments, in the fourth target following mode an autonomous vehicle may maintain a particular offset relative to a travel direction of a target and may aim a camera or other sensors at the target. In some embodiments, the particular offset may be based on an offset distance and an offset angle relative to the travel direction of the target. In some embodiments, the offset distance and/or offset angle may be preset in a mode configuration prior to mode execution, adjusted in real-time through a user interface, or may be set dynamically by repositioning the autonomous vehicle of the target and resetting the offset by user request or automatically on mode activation.

FIG. 14 illustrates a particular target position 1420 and a particular target velocity 1430. The particular target position 1420 may be an anticipated target position in the future based on a current target velocity. FIG. 14 further illustrates a particular autonomous vehicle position 1450 in relation to the particular target position 1420. The particular autonomous vehicle position 1450 may be based on a particular offset 1440 and a particular angle 1441 with respect to the particular target position 1420 and the particular target velocity 1430. For example, the particular autonomous vehicle position 1450 may be defined as a position that is offset from the particular target position 1420 by the particular offset 1440 where a straight line that intersects with the particular target position 1420 and the particular autonomous vehicle position 1450 that forms the particular angle 1441 with the particular target velocity 1430.

The particular autonomous vehicle position 1450 may be selected along a circle 1460 with respect to the particular target position 1420. The circle 1460 may have a radius equal to the particular offset 1440. For example, as the direction of the particular target velocity 1430 changes, the particular autonomous vehicle position 1450 may change along the circle 1460 to maintain the particular angle 1441. When the autonomous vehicle is outside the circle 1460, for example in position 1410, the autonomous vehicle may first move to intersect with the circle 1460. In some embodiments, the autonomous vehicle may move in a straight line 1415 along a shortest distance to the particular autonomous vehicle position 1450 and intersect with the circle 1460. Alternately or additionally, the autonomous vehicle may move along a tangent line 1417 that is tangent to the circle 1460 and includes a shortest arc length between the tangent location along the circle 1460 and the particular autonomous vehicle position 1450. In these and other embodiments, the autonomous vehicle may use the first target follow mode to reach the circle 1460 from the position 1410.

After finding a position on the circle 1460, the autonomous vehicle may adjust its position along the circle 1460 until the autonomous vehicle reaches the particular autonomous vehicle position 1450. For example, the autonomous vehicle may reach the circle 1460 at the position 1470 and may move along the circle 1460 based on incremental set points, such as set points 1471 and 1472, until reaching the particular autonomous vehicle position 1450. The velocity at which the autonomous vehicle may traverse the circle 1460 may be based on a velocity of the target.

Figure 15:
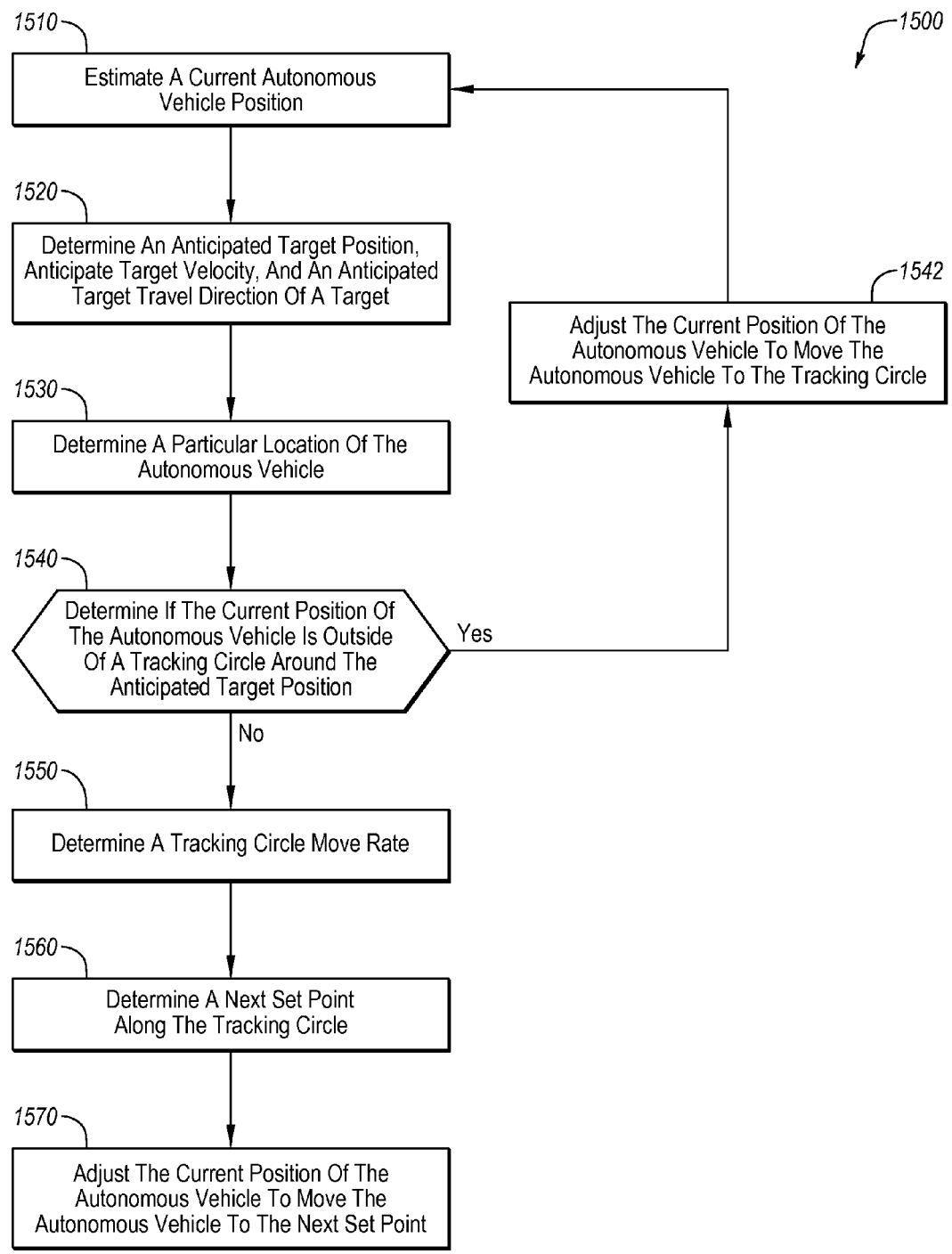
FIG. 15 is a flow chart of an example method of the fourth target following mode.

FIG. 15 is a flow chart of an example method 1500 of the fourth target following mode, which may be arranged in accordance with at least one embodiment described in this disclosure. The method 1500 may be implemented, in some embodiments, by a system, such as the system 100 or 200 of FIGS. 1 and 2. Although illustrated as discrete blocks, various blocks may be divided into additional blocks, combined into fewer blocks, or eliminated, depending on the desired implementation.

The method 1500 may begin at block 1510, where the autonomous vehicle may estimate a current autonomous vehicle position. In some embodiments, the current autonomous vehicle position may be estimated based on autonomous vehicle sensor readings collected by the autonomous vehicle.

In block 1520, an anticipated target position, anticipated target velocity, and an anticipated target travel direction may be determined. In some embodiments, the anticipated target position, the anticipated target velocity, and the anticipated target travel direction may be based on a current target position, velocity, and travel direction. In some embodiments, the current target position, velocity, and travel direction may be based on information received from a motion tracking device or as measured by the autonomous vehicle. In some embodiments, to compensate for the inherent latency in a data transfer between the target and the autonomous vehicle, the autonomous vehicle may use target prediction techniques to determine the anticipated target position, velocity, and travel direction based on the target position, velocity, and travel direction of the motion tracking device and/or previous target positions, velocity, and travel direction.

In some embodiments, a target may change direction and/or velocity rapidly, resulting in the anticipated target position, target velocity, and the target travel direction changing rapidly. In these and other embodiments, a low pass filter or averaging, may be applied to the current target position, velocity, and travel direction when determining the anticipated target position, target velocity, and the target travel direction.

In some embodiments, the low pass filter cut-off frequency may be determined based on a distance between a current position of the autonomous vehicle and the anticipated target position of the target. The larger the distance between the current position of the autonomous vehicle and the anticipated target position of the target, the lower the cut-off frequency of the low pass filter. In some embodiments, the low pass filter cut-off frequency may also be determined based on a current or anticipated velocity of the target. In these and other embodiments, the higher the current or anticipated velocity, the lower the cut-off frequency. In some embodiments, the low pass filter cut-off frequency may be preselected and not dynamically selected as described above.

In block 1530, a particular location of the autonomous vehicle may be determined. The particular location may be the particular autonomous vehicle position 1450 as illustrated in FIG. 14. The particular location of the autonomous vehicle may be based on the current location of the autonomous vehicle, the anticipated target position, the anticipated target velocity, the anticipated target travel direction, a particular offset, and particular angle.

In block 1540, it may be determined if the current position of the autonomous vehicle is outside of a tracking circle around the anticipated target position. The tracking circle may be the circle 1460 of FIG. 14. When the current position of the autonomous vehicle is outside the tracking circle, the method 1500 may proceed to block 1542. When the current position of the autonomous vehicle is along or inside the tracking circuit, the method 1500 may proceed to block 1550.

In block 1542, the autonomous vehicle may proceed to the tracking circle. In some embodiments, the autonomous vehicle may proceed to the tracking circle using the first follow mode or some other follow mode. In some embodiments, the autonomous vehicle may proceed to the tracking circle along a shortest path or along a tangent line that intersects the tracking circle at a point with a shortest arc length between the intersection of the tangent line and the particular location of the autonomous vehicle.

In block 1550, a tracking circle move rate may be determined. The tracking circle move rate may be a rate at which the autonomous vehicle may move along the tracking circle. Note that the tracking circle move rate is not a velocity of the autonomous vehicle, but rather a rate at which the autonomous vehicle may move around the tracking circle while also moving to maintain the tracking circle around the target as the target moves. Thus, the autonomous vehicle may be following the target and moving to maintain the tracking circle around the target while also moving around the tracking cycle to maintain the particular offset and angle with the direction of travel of the target.

The tracking circle move rate may be based on a speed of the target. For example, the tracking circle move rate may be calculated based on the following equation: tcmrate=tspeed*Kp, where tcmrate is the tracking circle move rate, tspeed is the speed of the target, and Kp is a variable based on the speed of the target. In some embodiments, Kp may be calculated based on the following equations:

$$\text{for } 0 \leq t\text{speed} \leq \max: Kp = K + (1-K)*(t\text{speed}/\max)$$

$$\text{for } \max < t\text{speed}: Kp = 1,$$

where K is a coefficient value and max is the maximum speed of the autonomous vehicle. In these and other embodiments, K may be greater than 1 and less than 10. For example, K may be 3. Note that tcmrate is limited to the maximum speed of the autonomous vehicle.

Based on the above, when the target is stationary and the autonomous vehicle is in the particular autonomous vehicle position, the autonomous vehicle does not move along the tracking circle but maintains the particular autonomous vehicle position. Furthermore, when the target moves slowly, the tracking circle move rate is determined to be Kp times faster than the speed of the target to allow the autonomous vehicle to reposition itself along the tracking circle to maintain the particular offset and the particular angle. Note that as the target accelerates, the Kp decreases and the tracking circle move rate becomes closer to the speed of the target. If the speed of the target exceeds a maximum speed of the autonomous vehicle, the autonomous vehicle may not maintain the position along the tracking circle.

In block 1560, a next set point along the tracking circle may be determined. In some embodiments, the next set point may be between a current autonomous vehicle along the tracking circle and the particular location of the autonomous vehicle. Alternately or additionally, the next set point may be the particular location of the autonomous vehicle. The next set point along the path may be determined based on the tracking circle move rate and a movement calculation cycle of the autonomous vehicle as explained with respect to FIG. 16. For example, the position may be one of the set points 1471, 1472, and 1450 as illustrated in FIG. 14. In general, the next set points may be calculated to bring the autonomous vehicle closer to the particular autonomous vehicle position based on the particular offset and the particular angle between the autonomous vehicle and the target.

In block 1570, the position of the autonomous vehicle may be adjusted based on the next set point to move the autonomous vehicle to the next set point along the tracking circle while maintaining the target within the target circle. In some embodiments, the next set point along the tracking circle may be the particular location along the tracking circle.

In some embodiments, adjusting the position of the autonomous vehicle may include determining an autonomous vehicle velocity and direction to adjust the position of the autonomous vehicle to the next set point and moving the target circle with respect to the movement of the target based on the anticipated target position, the anticipated target velocity, and the anticipated target travel direction. In these and other embodiments, the orientation of the autonomous vehicle and a payload of the autonomous vehicle may also be adjusted. In some embodiments, block 1570 may be followed by block 1510.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. For example, block 1570 may be expanded to include additional blocks such as determine actuators outputs based on the next set point and apply the determined actuator outputs to the actuators of the autonomous vehicle. Alternately or additionally, the block 1570 may be expanded to include determined orientation of a payload of the autonomous vehicle and/or the orientation of the autonomous vehicle.

Figure 16:
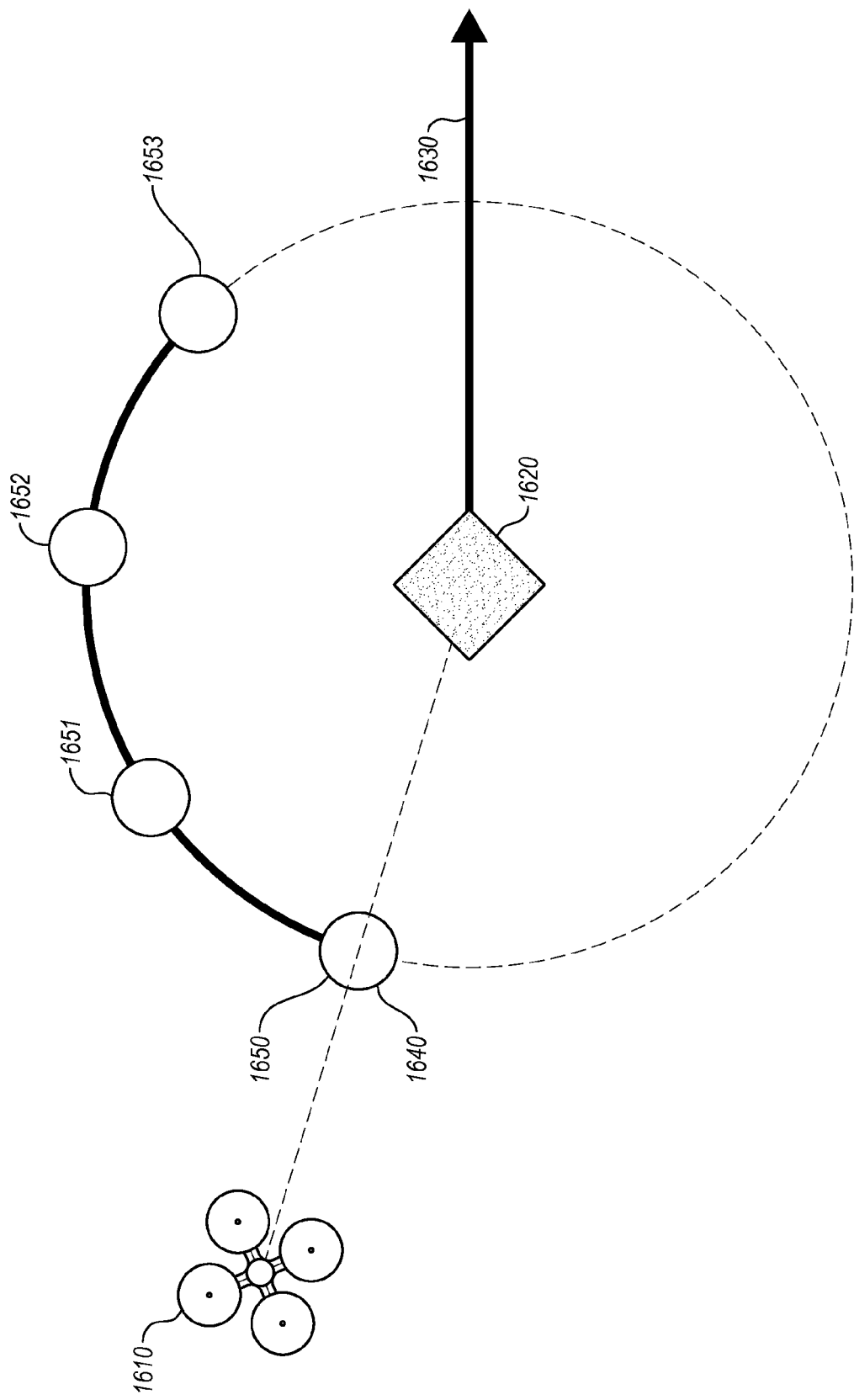
FIG. 16 illustrates an example of a fifth target following mode.

FIG. 16 illustrates an example of a fifth target following mode, which may be arranged in accordance with at least one embodiment described in this disclosure. In some embodiments, in the fifth target following mode an autonomous vehicle may circle a target at particular radius from the target and aims a camera or other sensors at the target as the target moves.

For example, FIG. 16 illustrates a particular target position 1620 and a particular target velocity 1630. The particular target position 1620 may be an anticipated target position in the future based on a current target velocity. FIG. 16 further illustrates a path 1640 around the particular target position 1620. As illustrated in FIG. 16, the path 1640 may be circular. Alternately, the path 1640 may be any other shape such as elliptical, rectangular, square, or some other shape.

In some embodiments, the particular target position 1620 may be in a center of the path 1640. In these and other embodiments, the path 1640 may be level in a plane parallel to a ground or surface traversed by the target. Alternately or additionally, the path 1640 may be tilted with respect to the ground or surface traversed by the target such that at different points the path 1640 may have varying distances between the ground and the path 1640.

In some embodiments, a path shape, a radius between the path 1640 and the target, the direction of orientation of the autonomous vehicle while traversing the path 1640, and a rate of traversing the path 1640, for example a number of revolutions around the path 1640 in a particular time, may be selected by a user or based on other factors. The other factors may include other following modes selected to follow the target, a speed of the target, an activity being performed by the target, among other factors.

FIG. 16 further illustrates a current autonomous vehicle position 1610, a first autonomous vehicle position 1650 along the path 1640, a second autonomous vehicle position 1651 along the path 1640, a third autonomous vehicle position 1652 along the path 1640, and a fourth autonomous vehicle position 1653 along the path 1640.

An autonomous vehicle may be configured to traverse the path 1640 while maintaining the target located in an approximate middle of the path 1640 as the target moves. When the autonomous vehicle is outside the path 1660, for example in the current autonomous vehicle position 1610, the autonomous vehicle may first move to intersect with the path 1640. In some embodiments, the autonomous vehicle may move in a straight line along a shortest distance to intersect with the path 1640. In these and other embodiments, the autonomous vehicle may use the first target follow mode to reach the path 1640 from the current autonomous vehicle position 1610.

After finding a position on the path 1640, the autonomous vehicle may traverse the path 1640 by selecting a next position along the path 1640 and traversing to the next position. For example, the autonomous vehicle may begin at the first autonomous vehicle position 1650. The autonomous vehicle may determine the second autonomous vehicle position 1651 and traverse to the second autonomous vehicle position 1651. After reaching the second autonomous vehicle position 1651, the autonomous vehicle may determine the position of the third autonomous vehicle position 1652 and may traverse to the third autonomous vehicle position 1652. After reaching the third autonomous vehicle position 1652, the autonomous vehicle may determine the fourth autonomous vehicle position 1653 and may traverse to the fourth autonomous vehicle position 1653. In these and other embodiments, the autonomous vehicle may traverse the path 1640 at a rate equal to a rate defined by a user.

In some embodiments, different positions selected along the path 1640 may depend on movement calculation cycles of the autonomous vehicle. Movement calculation cycles may be used by the autonomous vehicle to follow the target. For example, the target may be moving in an irregular pattern. To follow the target, the autonomous vehicle may update the location and velocity of the target and adjust the velocity and direction of the autonomous vehicle based on the updated location and velocity of the target. Examples of adjusting the velocity and direction of the autonomous vehicle include the first, second, and third target following modes described in this disclosure.

Each update of the location and velocity of the target may be referred to a as movement calculation cycle. In these and other embodiments, a distance between different locations selected along the path 1640 may be based on the rate at which the autonomous vehicle is traversing the path 1640 and the time between movement calculation cycles. In these and other embodiments, the autonomous vehicle may arrive at the next location selected along the path 1640 during the next calculation cycle. In the next movement calculation cycle, the autonomous vehicle may select an additional location along the path 1640 based on an update of the location and velocity of the target at the next movement calculation cycle.

The path 1640 illustrated in FIG. 16 may be illustrative of the target not moving as the autonomous vehicle traverses the path 1640. If the target is moving, at a first time the particular target position 1620 may be at the current position and the first autonomous vehicle position 1650 may be at the current position. At a second time, the particular target position 1620 may be at another position in the direction of the particular target velocity 1630. In these and other embodiments, the second autonomous vehicle position 1651 may be at another position in the direction of the particular target velocity 1630 but in the same relative position with respect to the location of the second autonomous vehicle position 1651 along the path 1640 with respect to the target. In short, the autonomous vehicle may traverse the path 1640 while at the same time following the target in a similar manner as a first body orbits a second body while the second body moves.

Figure 17:
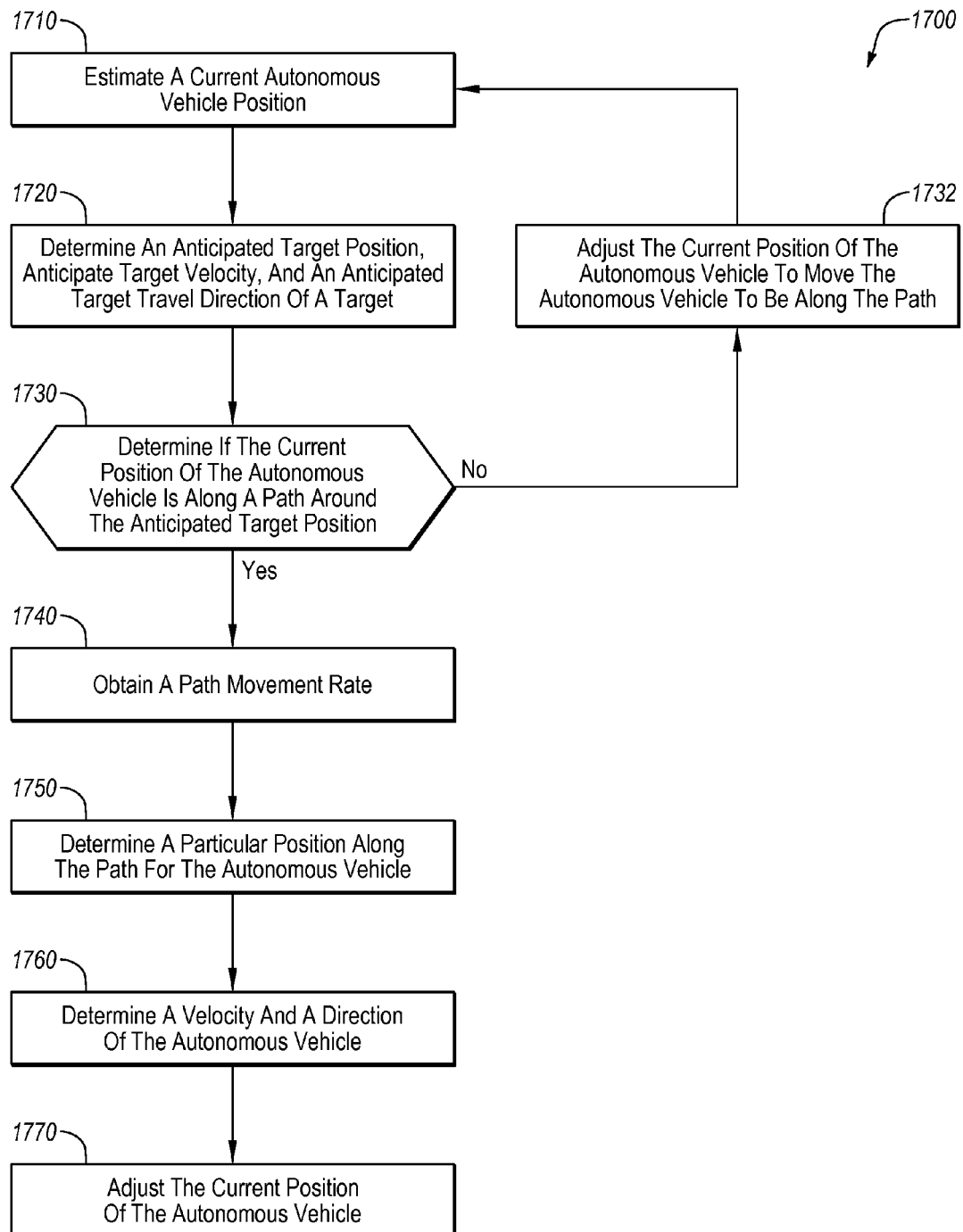
FIG. 17 is a flow chart of an example method of the fifth target following mode.

FIG. 17 is a flow chart of an example method 1700 of the fifth target following mode, which may be arranged in accordance with at least one embodiment described in this disclosure. The method 1700 may be implemented, in some embodiments, by a system, such as the system 100 or 200 of FIGS. 1 and 2. Although illustrated as discrete blocks, various blocks may be divided into additional blocks, combined into fewer blocks, or eliminated, depending on the desired implementation.

The method 1700 may begin at block 1710, where the autonomous vehicle may estimate a current autonomous vehicle position. In some embodiments, the current autonomous vehicle position may be estimated based on autonomous vehicle sensor readings collected by the autonomous vehicle.

In block 1720, an anticipated target position, anticipated target velocity, and an anticipated target travel direction may be determined. In some embodiments, the anticipated target position, the anticipated target velocity, and the anticipated target travel direction may be based on a current target position, velocity, and travel direction. In some embodiments, the current target position, velocity, and travel direction may be based on information received from a motion tracking device or as measured by the autonomous vehicle. In some embodiments, to compensate for the inherent latency in a data transfer between the target and the autonomous vehicle, the autonomous vehicle may use target prediction techniques to determine the anticipated target position, velocity, and travel direction based on the target position, velocity, and travel direction of the motion tracking device and/or previous target positions, velocity, and travel direction.

In block 1730, it may be determined if the current autonomous vehicle position is along a path around the anticipated target position. The path may be the path 1660 of FIG. 16. When the current autonomous vehicle position is not along the path, the method 1700 may proceed to block 1732. When the current autonomous vehicle position is along the path, the method 1700 may proceed to block 1740.

In block 1732, the current position of the autonomous vehicle may be adjusted to move the autonomous vehicle to be along the path. In some embodiments, the autonomous vehicle may proceed to the path using the first follow mode or some other follow mode. In some embodiments, the autonomous vehicle may proceed to the path along a shortest path between the current autonomous vehicle position and the path.

In block 1740, a path movement rate may be obtained. The path movement rate may be obtained from user input or calculated based on an activity being performed by the target or based on some other calculation.

In block 1750, a position along the path for the autonomous vehicle may be determined. The position along the path may be determined based on the path movement rate and a movement calculation cycle of the autonomous vehicle. For example, the position may be one of the positions 1650, 1651, 1652, and 1653 of FIG. 16.

In block 1760, a velocity and a direction of the autonomous vehicle may be determined. The velocity and the direction of the autonomous vehicle may be based on the anticipated target position, the anticipated target velocity, and the anticipated target travel direction to maintain the target within the path of the autonomous vehicle as well as to move the autonomous vehicle along the path to the position determined in block 1750. In some embodiments, the velocity and the direction of the autonomous vehicle may be determined to maintain the target within the path using one or more of the other following modes described in this disclosure.

In block 1770, the position of the autonomous vehicle may be adjusted based on the position, the path movement rate, the velocity, and the direction. In some embodiments, block 1770 may be followed by block 1710.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 18:
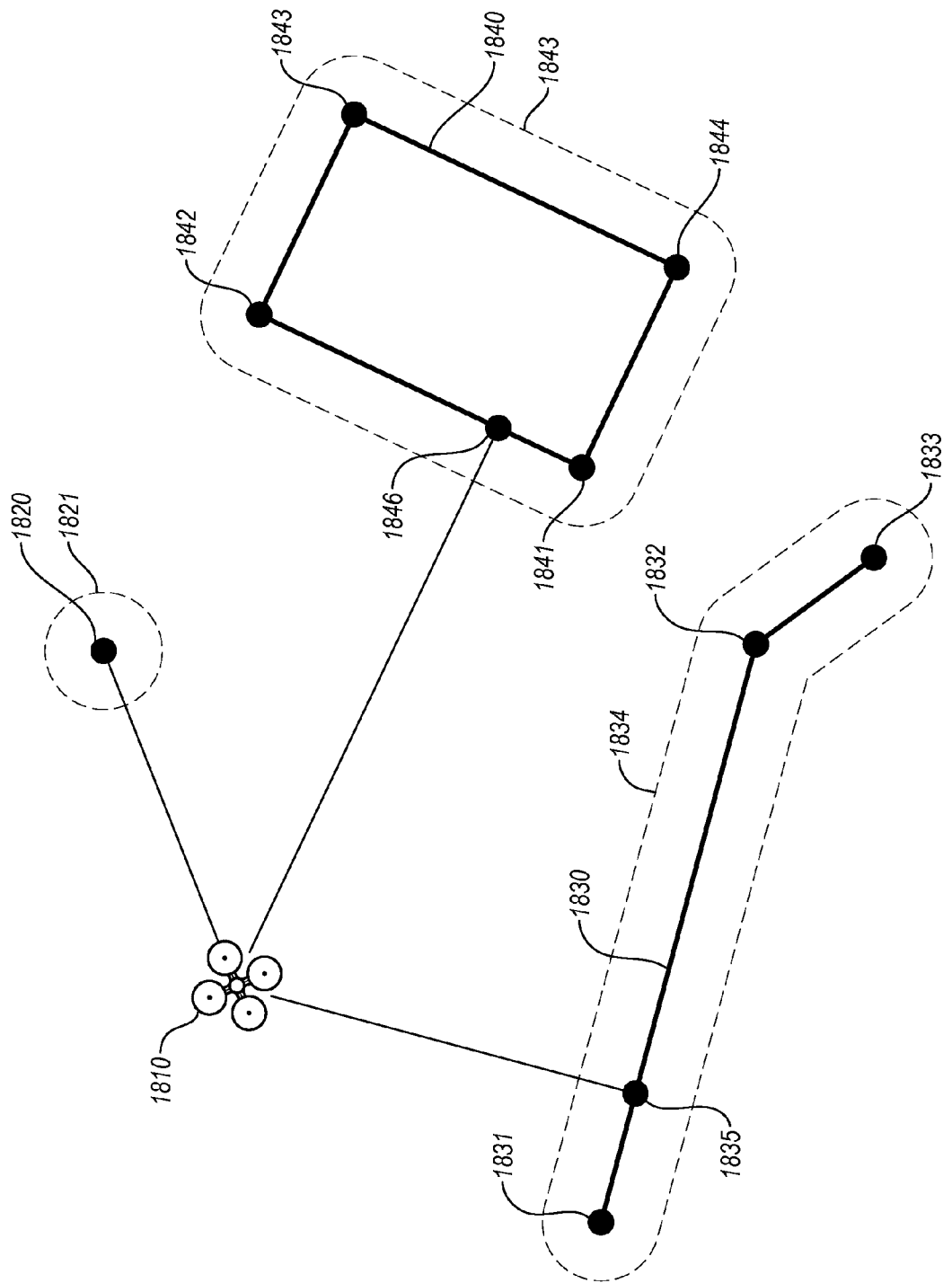
FIG. 18 illustrates various example parking zones.

FIG. 18 illustrates various example parking zones, which may be arranged in accordance with at least one embodiment described in this disclosure. In some embodiments, an autonomous vehicle may be following a target. For example, the autonomous vehicle may be following a target using any one of the following modes describes in this disclosure. After a period, the autonomous vehicle may determine to end following the target and to commence a parking sequence. The autonomous vehicle may determine to end following a target based on an indication from the target, unsafe weather conditions, low power supplies, such as battery or fuel, or other operating conditions.

During a parking sequence, an autonomous vehicle may be configured to identify one or more parking zones. In these and other embodiments, a parking zone may be a zone that has been previously designated as a parking zone. In some embodiments, information about the parking zone may be stored in the autonomous vehicle after the autonomous vehicle began following the target. Alternately or additionally, information about the safe parking zone may be provided to the autonomous vehicle through a network connection from a cloud network or data storage, from a motion tracking device, or from some other device. The safe parking zone may be provided in connection with the autonomous vehicle receiving an indication to stop following the target or in response to an indication from the autonomous vehicle that the autonomous vehicle will stop following the target.

In some embodiments, the autonomous vehicle may identify the parking zone that is the closest to the autonomous vehicle. After identification of the closest parking zone, the autonomous vehicle may select a particular location within the parking zone as a parking destination. The autonomous vehicle may select a traversal path to the parking destination. For example, when the autonomous vehicle is an aerial vehicle, the autonomous vehicle may adjust to a particular altitude above the ground, such as 150 feet, to avoid a majority of obstacles and traverse to the parking destination. As another example, when the autonomous vehicle is a land vehicle, the autonomous vehicle may plot a course using a topographical map to the parking destination that avoids obstacles such as lakes, cliffs, and such. After traversing to the parking destination, the autonomous vehicle may park and wait for further instruction. The further instruction may be based on instructions stored in the autonomous vehicle or received over a network from another device.

FIG. 18 illustrates a spot parking zone 1820, a line parking zone 1830, and a region parking zone 1840, but other parking zone configurations are contemplated. Each of the spot parking zone 1820, the line parking zone 1830, and the region parking zone 1840 may include an acceptance boundary. An acceptance boundary may be used by an autonomous vehicle to determine when the autonomous vehicle has reached the parking zone without requiring precise adjustments to land at a particular destination. For example, the autonomous vehicle may include some position estimation error. The acceptance boundary may be set such that the acceptance boundary is larger than the position estimation error of the autonomous vehicle.

The spot parking zone 1820 may be a particular location. The spot parking zone 1820 may include a spot acceptance boundary 1821. An autonomous vehicle may determine a distance between a current position 1810 of the autonomous vehicle and the spot parking zone 1820 based on a shortest travel path between the current position 1810 and the spot parking zone 1820. The shortest travel path may be straight path or a complex curve based on factors such weather, terrain, power levels, and other factors. The autonomous vehicle may traverse to the spot parking zone 1820. After reaching the spot acceptance boundary 1821, the autonomous vehicle may park at the spot parking zone 1820.

The line parking zone 1830 may be a line defined by two or more points. As illustrated in FIG. 18, the line parking zone 1830 is defined by a first point 1831, a second point 1832, and a third point 1833. The line parking zone 1830 may include a line acceptance boundary 1834 that surrounds the line defined by the first point 1831, the second point 1832, and the third point 1833.

In some embodiments, an autonomous vehicle may select a park position along the line parking zone 1830 for parking. In some embodiments, the line parking zone 1830 may include a particular parking position along the line parking zone 1830 that may be selected before other parking positions. For example, the particular parking position may be a preferred parking position along the line parking zone 1830. In these and other embodiments, the particular parking position may be selected based on user configurations, power levels, weather conditions, and/or other factors.

In some embodiments, the autonomous vehicle may select a closest parking position along the line parking zone 1830 as the parking position. In these and other embodiments, the autonomous vehicle may determine the closest parking position based on a shortest travel path between the current position 1810 of the autonomous vehicle and the line parking zone 1830.

To determine a shortest travel path, the autonomous vehicle may be configured to detect a nearest point that defines the line parking zone 1830 based on travel paths between the points of the line parking zone 1830 and the current position 1810 of the autonomous vehicle. For example, as illustrated, the first point 1831 may be the closest point of the line parking zone 1830 to the current position 1810.

The autonomous vehicle may determine segments of the line parking zone 1830 that are directly coupled to the closest point. For each of the determined segments, the autonomous vehicle may determine a segment with a position along the segment that is closest to the current position 1810. The closest position may be selected as a parking position. For example, the position 1835 is the closest position along the segment that is directly coupled to the first point 1831. Note that a travel path may be a straight line or a complex curve.

The region parking zone 1840 may be a region defined by three or more points. As illustrated in FIG. 18, the region parking zone 1840 is defined by a first point 1841, a second point 1842, a third point 1843, and a fourth point 1844. The region parking zone 1840 may include a line acceptance boundary 1845 that surrounds the region defined by the first point 1841, the second point 1842, the third point 1843, and the fourth point 1844.

In some embodiments, an autonomous vehicle may select a park position within the region parking zone 1840 for parking. In some embodiments, the region parking zone 1840 may include a particular parking position within the region parking zone 1840 that may be selected before other parking positions. For example, the particular parking position may be a preferred parking position within the region parking zone 1840. In these and other embodiments, the particular parking position may be selected based on user configurations, power levels, weather conditions, and/or other factors.

In some embodiments, the autonomous vehicle may select a closest parking position within the region parking zone 1840 as the parking position. In these and other embodiments, the autonomous vehicle may determine the closest parking position based on a shortest travel path between the current position 1810 of the autonomous vehicle and the region parking zone 1840. The shortest travel path may be a straight line or a complex curve.

To determine a shortest travel path, the autonomous vehicle may be configured to detect a nearest point that defines the region parking zone 1840 based on travel paths between the points of the region parking zone 1840 and the current position 1810 of the autonomous vehicle. For example, as illustrated, the first point 1841 may be the closest point of the region parking zone 1840 to the current position 1810.

The autonomous vehicle may determine segments of the region parking zone 1840 that are directly coupled to the closest point. For each of the determined segments, the autonomous vehicle may determine a segment with a position along a travel path that is closest to the current position 1810. The closest position may be selected as a parking position. For example, the position 1846 is the closest position along the segment that is directly coupled to the first point 1841. Modifications, additions, or omissions may be made to the example parking zones without departing from the scope of the present disclosure.

Figure 19:
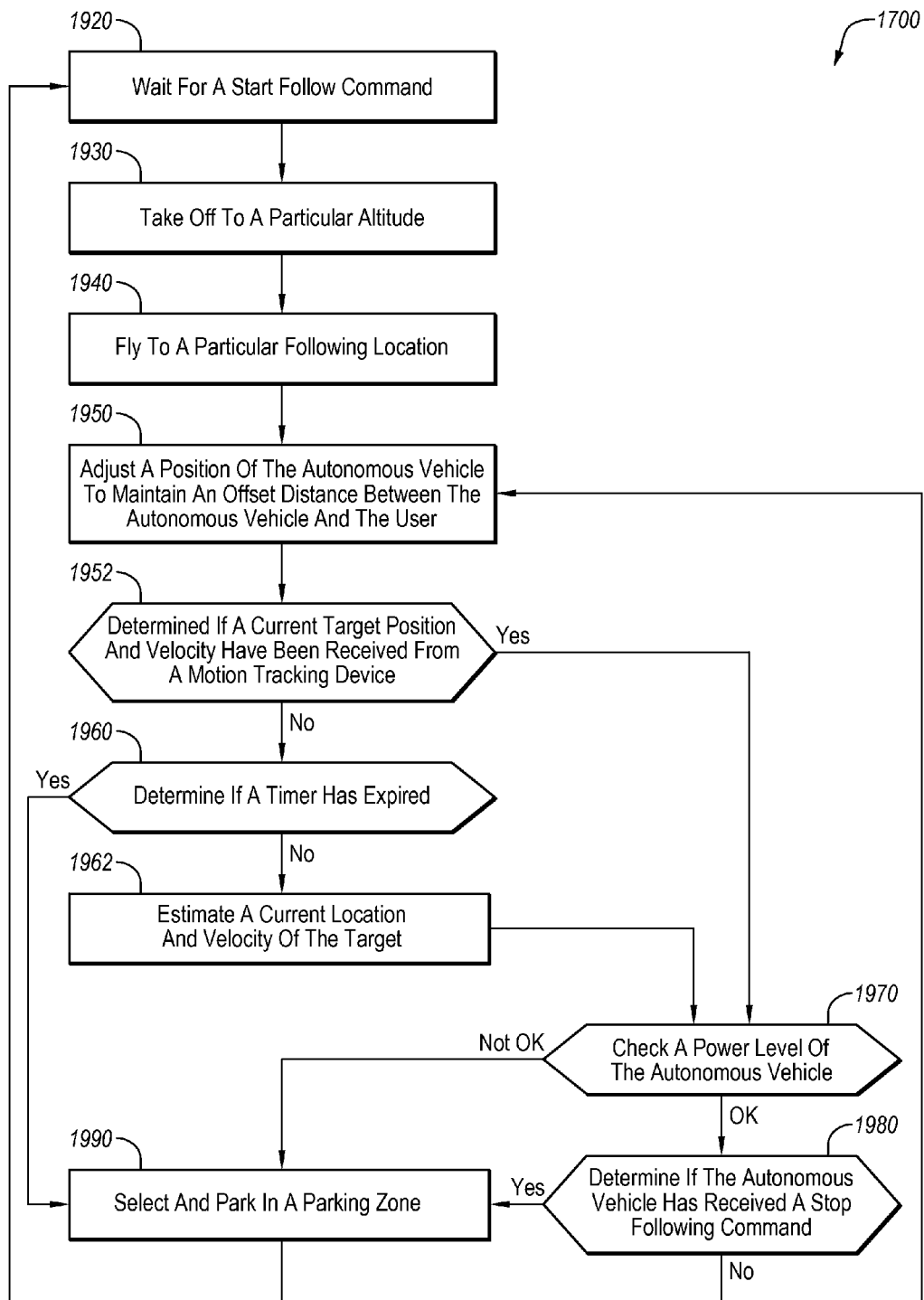
FIG. 19 is a flow chart of an example method of autonomous vehicle following during surfing.

FIG. 19 is a flow chart of an example method 1900 of autonomous vehicle following during surfing, which may be arranged in accordance with at least one embodiment described in this disclosure. The method 1900 may be implemented, in some embodiments, by a system, such as the system 100 or 200 of FIGS. 1 and 2. Although illustrated as discrete blocks, various blocks may be divided into additional blocks, combined into fewer blocks, or eliminated, depending on the desired implementation. The method 1900 may be described with respect to FIG. 20, which illustrates an example of an autonomous vehicle following a user while the user is surfing. The method 1900 may be performed by an aerial autonomous vehicle. Other similar methods may be performed by non-aerial autonomous vehicles or with respect to other activities.

The method 1900 may begin at block 1920, where the autonomous vehicle may wait for a start follow command. In these and other embodiments, the autonomous vehicle may have been powered on and left at a start position. The start position may be the start position 2010 of FIG. 20 on a beach or other land position. After powering on the autonomous vehicle, a user may paddle out and begin to surf. In some embodiments, when the user desires that the autonomous vehicle begin to follow the user, the user may issue a start command to the autonomous vehicle. In some embodiments, the start follow command may be a data command sent over a wireless network. For example, a user may issue a command by way of a motion tracking device associated with the user. Alternately or additionally, a user may issue a command using signaling, such as waving a hand. Alternately or additionally, the autonomous vehicle may issue a start follow command based on certain conditions. For example, the autonomous vehicle may issue a start follow command when the autonomous vehicle detects a wave of certain size, an expiration of a timer, a particular acceleration of a motion tracking device, user, or object, or based on some other factor or event.

In block 1930, the autonomous vehicle may take off to a particular altitude. The particular altitude may be preselected by the user or by a surfing following mode. Alternately or additionally, the particular altitude may be selected based on conditions. For example, the particular altitude may be selected based on the size of waves or wind speeds.

Figure 20:
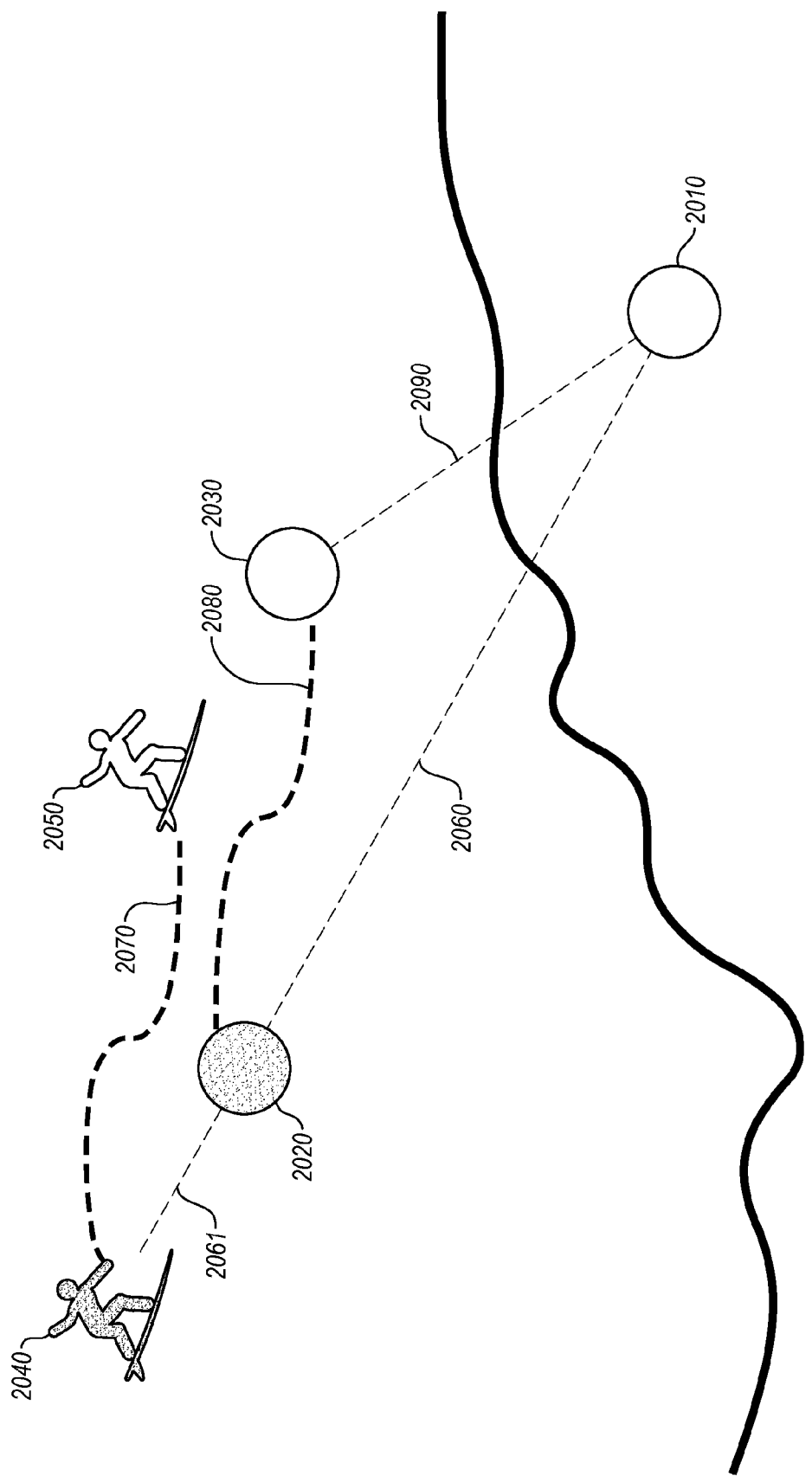
FIG. 20 illustrates an example of autonomous vehicle following during surfing.

In block 1940, the autonomous vehicle may fly to a particular following location. In these and other embodiments, the autonomous vehicle may select the particular following location based on an offset distance from a user position. The offset distance may be selected by the user previously, particular to the selected surfing following mode, and/or determined by the autonomous vehicle based on conditions of the surf and weather. For example, FIG. 20 illustrates an offset 2061 from a first user position 2040 and a first particular following location 2020. In these and other embodiments, the autonomous vehicle may select a shortest travel distance between the particular following location and the start position. In some embodiments, the shortest travel distance may be a straight line between the particular following location and the start position.

In some embodiments, the autonomous vehicle may adjust the position of the particular following location while flying to the particular following location based on a change in location of the user.

In block 1950, a position of the autonomous vehicle may be adjusted to maintain the offset distance between the autonomous vehicle and the user. In some embodiments, the position of the autonomous vehicle may be adjusted using a portion or all of one or more of the target following modes described in this disclosure. For example, in some embodiments, the first target following mode may be used. In these and other embodiments, the start position of the autonomous vehicle may be the home position. Alternately or additionally, another location may be the home position. In these and other embodiments, generally speaking, the autonomous vehicle may determine the current target position and velocity based on readings received from a motion tracking device associated with the user. Based on the current target position and velocity, the autonomous vehicle may adjust its position as described with respect to FIGS. 3 and 4 or other figures of this disclosure to follow the motion tracking device and thus the user. While following the motion tracking device, the autonomous vehicle may video the user with the sensor payload. For example, as illustrated in FIG. 20, the user may follow a user path 2070 from the first user position 2040 to a second user position 2050. In these and other embodiments, the autonomous vehicle may follow the user path 2070 along the autonomous vehicle path 2080 from the first particular following location 2020 to a second particular following location 2030.

In some embodiments, the method 1900 may include block 1952 where it may be determined if current target position and velocity have been received from the motion tracking device. If the current target position and velocity have been received from the motion tracking device, the method 1900 may proceed to block 1970. If the current target position and velocity have not been received from the motion tracking device, the method 1900 may proceed to block 1960.

In block 1960, it may be determined if a timer has expired. The timer may be an indication of how long the autonomous vehicle has not received current target position and velocity from the motion tracking device. If the autonomous vehicle does not receive the current target position and velocity from the motion tracking device within the time allotted by the timer, the method 1900 may proceed to block 1990. If the time allotted by the timer has not expired, the method 1900 may proceed to block 1962.

The timer may allow the autonomous vehicle to maintain an unsteady wireless connection with the motion tracking device but still continue to track the motion tracking device. In this and other embodiments, the unsteady wireless connection may be a wireless connection that may disconnect and then reconnect at any interval. In some embodiments, the timer may be set by the user or determined by the autonomous vehicle. An example of the use of the timer is now provided. If the motion tracking device was attached to an arm of a user, and the user was paddling his board such that the arm of the user, and thus the motion tracking device was under the water for some periods of time, the connection between the motion tracking device and the autonomous vehicle may be disconnected. However, the user may want the autonomous vehicle to continue tracking the user. In these and other embodiments, the arm of the user, and thus the motion tracking device, may come out of the water and reestablish connection with the autonomous vehicle before the timer expires. In these and other embodiments, the connection and reconnection may occur in cycles.

In block 1962, the current location and velocity of the target may be estimated. In these and other embodiments, the current location and velocity of the target may be estimated based on a time from last receiving the location and velocity of the target and the location and the velocity previously received. In these and other embodiments, the estimated current location and velocity of the target may be used as the current location and velocity in the target following mode being performed at block 1950.

In block 1970, a power level of the autonomous vehicle may be checked. When the power level of the autonomous vehicle is at an acceptable level to allow the autonomous vehicle to continue following the user, the method 1900 may proceed to block 1980. When the power level of the autonomous vehicle is at a level which the autonomous vehicle may no longer follow the user, the method 1900 may proceed to block 1990. The level at which the autonomous vehicle may no longer follow the user may be determined based on a distance between the location of the autonomous vehicle and a particular parking zone as described with respect to FIG. 18 or the start position of the autonomous vehicle. In these and other embodiments, the level at which the autonomous vehicle may no longer follow the user may be further based on weather conditions. For example, a windy day may consume more power than a non-windy day to navigate the same distance to the particular parking zone.

In block 1980, it may be determined if the autonomous vehicle has received a stop following command. When the autonomous vehicle receives a stop following command, the method 1900 may proceed to block 1990. When the autonomous vehicle has not received a stop following command, the method 1900 may proceed to block 1950. A stop follow command may be received in a similar or different manner than the start follow command. In some embodiments, the stop follow command may be sent as a data command sent over a wireless network. For example, a user may issue a command by way of a motion tracking device associated with the user. Alternately or additionally, a user may issue a command using signaling, such as waving a hand. Alternately or additionally, the autonomous vehicle may issue a stop follow command based on certain conditions. For example, the autonomous vehicle may issue a stop follow command when the autonomous vehicle detects a wave of certain size, an expiration of a timer, a particular deceleration of a motion tracking device, user, or object, and/or based on some other factor or event.

In block 1990, the autonomous vehicle may select a parking zone and may park in the selected parking zone. In some embodiments, the parking zone may include the start location. Alternately or additionally, the parking zone may be another location, such as a predefined location. In these and other embodiments, the autonomous vehicle may select and park following the procedures discussed with respect to FIG. 18. Alternately or additionally, the autonomous vehicle may perform other procedures to select a parking zone and park in the parking zone.

In some embodiments, the block 1990 may be followed by the block 1920. In these and other embodiments, the method 1900 may be repeated.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. For example, in some embodiments, the method 1900 may include determining the health of the autonomous vehicle. In these and other embodiments, the health of the autonomous vehicle due to technical difficulties or weather, may cause the method 1900 to proceed to block 1990.

Figure 21:
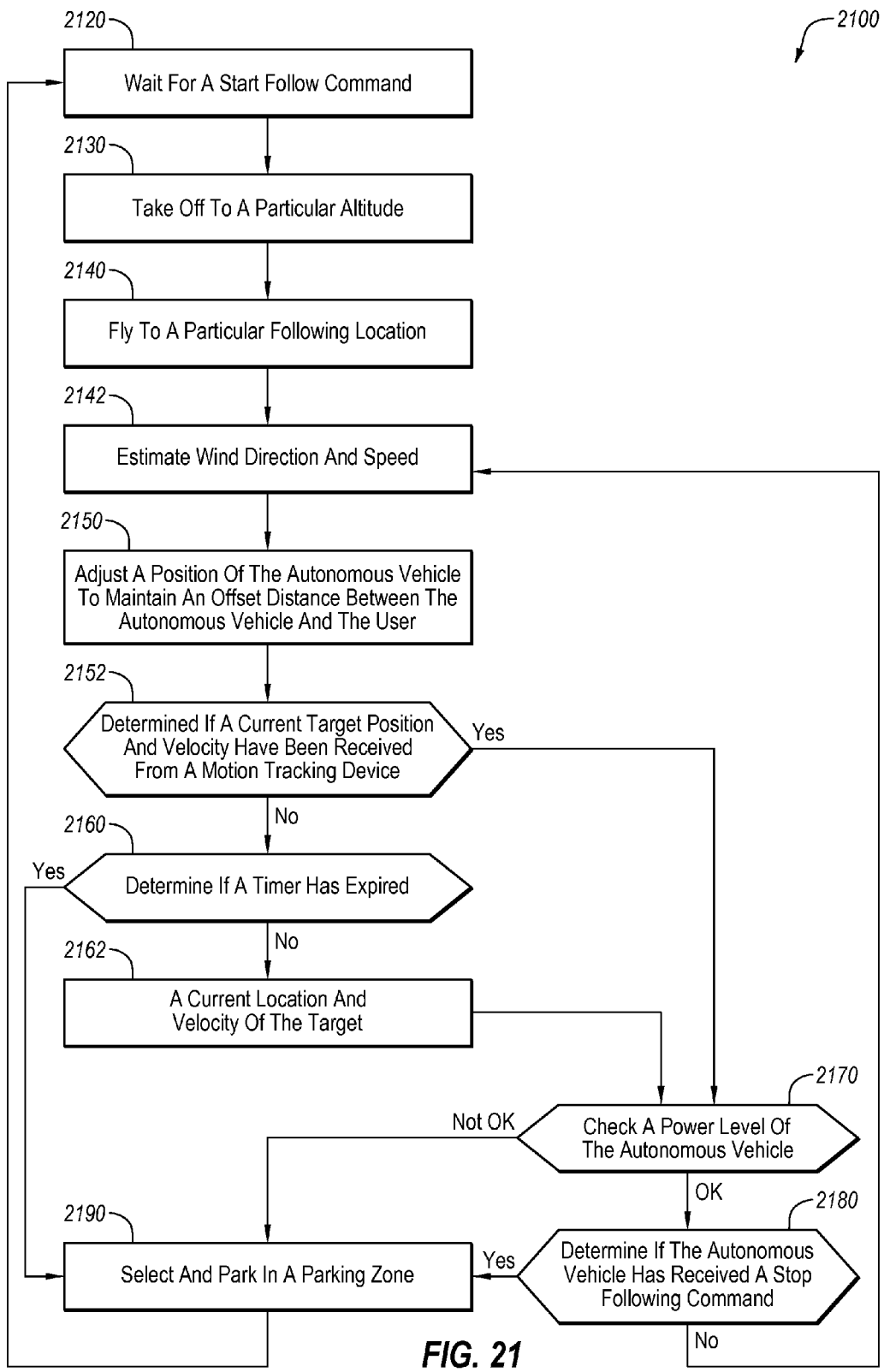
FIG. 21 is a flow chart of an example method of autonomous vehicle following during kite boarding.

FIG. 21 is a flow chart of an example method of autonomous vehicle following during kite boarding, which may be arranged in accordance with at least one embodiment described in this disclosure. The method 2100 may be implemented, in some embodiments, by a system, such as the system 100 or 200 of FIGS. 1 and 2. Although illustrated as discrete blocks, various blocks may be divided into additional blocks, combined into fewer blocks, or eliminated, depending on the desired implementation. The method 2100 may be described with respect to FIG. 22, which illustrates an example of autonomous vehicle following a user while the user is kite boarding. The method 2100 may be performed by an aerial autonomous vehicle. Other similar methods may be performed by non-aerial autonomous vehicles or with respect to other activities.

The method 2100 may begin at block 2120, where the autonomous vehicle may wait for a start follow command. In these and other embodiments, the autonomous vehicle may have been powered on and left a start position. The start position may be the start position 2210 of FIG. 22 on a beach or other land position. After the powering on the autonomous vehicle, a user may paddle out and begin to kite surf. In some embodiments, when the user desires that the autonomous vehicle begin to follow the user, the user may issue a start commend to the autonomous vehicle. In some embodiments, the start follow command may be a data command sent over a wireless network. For example, a user may issue a command by way of a motion tracking device associated with the user. Alternatively or additionally, a user may issue a command using signaling, such as waving a hand. Alternately or additionally, the autonomous vehicle may issue a start follow command based on certain conditions. For example, the autonomous vehicle may issue a start follow command when the autonomous vehicle detects a wave of certain size, an expiration of a timer, a particular acceleration of a motion tracking device, user, or object, or based on some other factor or event.

In block 2130, the autonomous vehicle may take off to a particular altitude and estimate wind direction and speed. The particular altitude may be preselected by the user or by a kite surfing following mode. Alternately or additionally, the particular altitude may be selected based on conditions. For example, the particular altitude may be selected based on the size of waves or wind speeds. The altitude may be selected to be higher than the kite when the kite is deployed.

To estimate the wind direction and speed, the autonomous vehicle may use one or more airspeed sensors or inertial sensors. In some embodiments, the autonomous vehicle may use the airspeed sensor or inertial sensors in combination with the altitude, location, velocity, power usage to fly, and aerodynamic characteristics of the autonomous vehicle to determine the wind speed. For example, the autonomous vehicle may use the inertial sensor to determine its velocity. Based on the velocity, power usage, and aerodynamic characteristics, the autonomous vehicle may determine the wind speed and direction based on typical velocities with corresponding power usage with known wind velocities.

Figure 22:
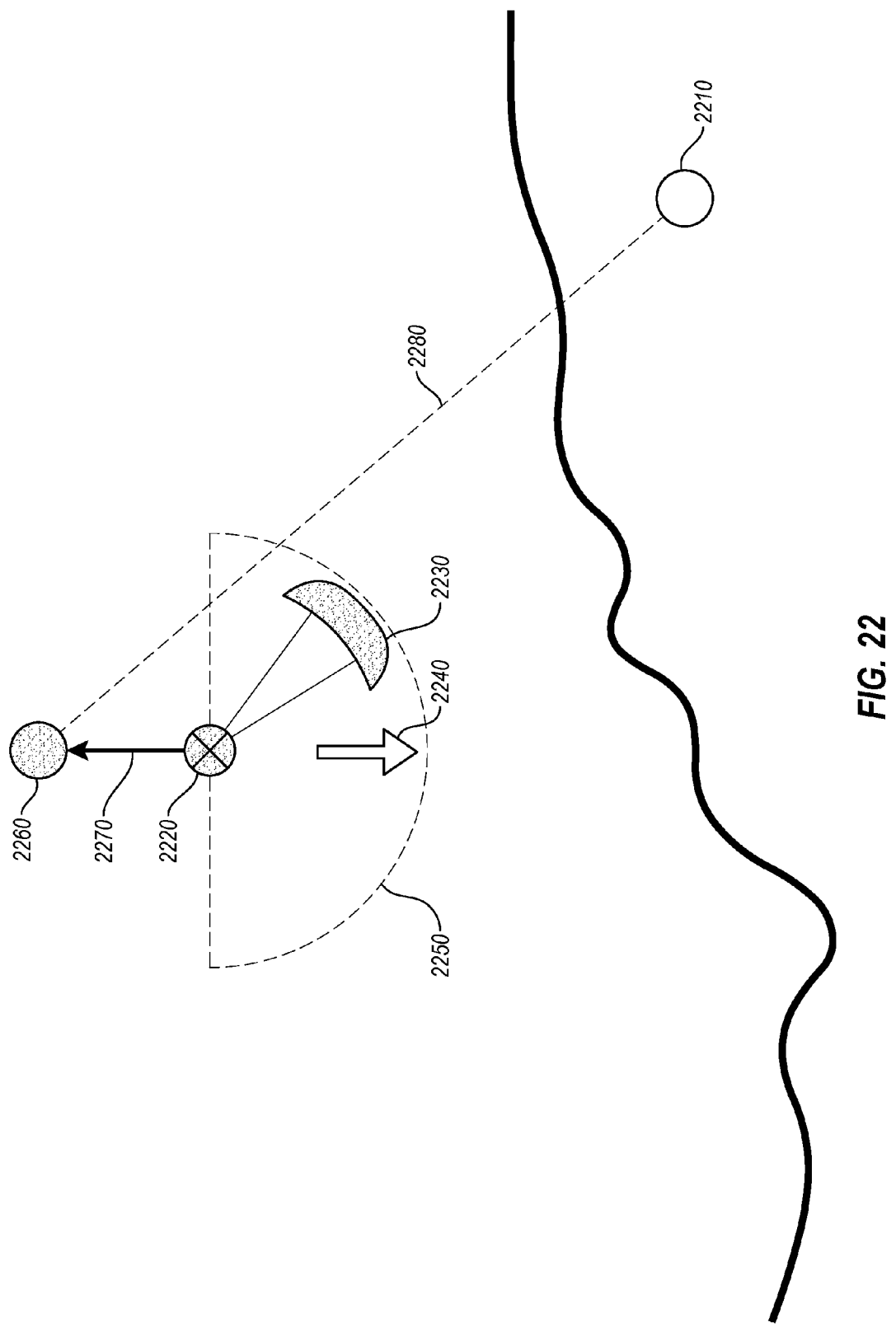
FIG. 22 illustrates an example of autonomous vehicle following during kite boarding.

In block 2140, the autonomous vehicle may fly to a particular following location. In these and other embodiments, the autonomous vehicle may select the particular following location based on an offset distance from a user position that is upwind of the user position. The offset distance may be selected by the user previously, particular to the selected kite surfing following mode, or determined by the autonomous vehicle based on conditions of the surf and weather. For example, FIG. 22 illustrates an offset 2270 from a first user position 2220 and a wind direction 2240 that may be used to determine a first particular following location 2260. In these and other embodiments, the autonomous vehicle may select a shortest travel distance between the particular following location and the start position. In some embodiments, the shortest travel distance may be a straight line between the particular following location and the start position. In these and other embodiments, the autonomous vehicle may select an altitude above the height of the kite to avoid collisions with the kite.

In some embodiments, the autonomous vehicle may adjust the position of the particular following location why flying to the particular following location based on a changing location of the user or a change in direction of the wind.

In block 2142, the autonomous vehicle may estimate wind direction and speed. The wind direction and speed may affect the travel of the user. Furthermore, the wind direction may affect the position of the kite. In some embodiments, based on the wind direction, the autonomous vehicle may calculate a no-fly region based on potential locations of the kite to avoid collisions with the kite. In these and other embodiments, the no-fly region may be a quarter of a sphere downwind from the user. For example, the sphere may have an outline 2250 as illustrated in FIG. 22. A kite 2230 may maintain outside the outline 2250 when the wind is in the wind direction 2240.

In some embodiments, the autonomous vehicle may perform a low pass filter with respect to the direction and velocity of the wind. The low pass filter may filter out gust and/or rapid changes in the wind. The rapid changes of wind and gusts of wind may not affect the direction and velocity of the user enough to compensate for these rapidly changing events.

In block 2150, a position of the autonomous vehicle may be adjusted to maintain the offset distance between the autonomous vehicle and the user. In some embodiments, the position of the autonomous vehicle may be adjusted using a portion or all of one or more of the target following modes described in this disclosure, the direction of the wind, and/or the no-fly region based on the potential locations of the kite. For example, in some embodiments, the first target following mode may be used. In these and other embodiments, the start position of the autonomous vehicle may be the home position. Alternately or additionally, another location may be the home position. In these and other embodiments, generally speaking, the autonomous vehicle may determine the current target position and velocity based on readings received from a motion tracking device associated with the user. Based on the current target position and velocity, the autonomous vehicle may adjust its position as described with respect to FIGS. 3 and 4 and/or other figures described in this disclosure to follow the motion tracking device and thus the user. Further, when selecting it position, the autonomous vehicle may adjust the position to maintain upwind of the user and to not fly into the no-fly region. In particular, the autonomous vehicle may select its position such that the autonomous vehicle maintains a particular distance from the no-fly region to avoid potential interference with the kite of the user. While following the motion tracking device, the autonomous vehicle may video the user with the sensor payload.

In some embodiments, the method 2100 may include block 2152 where it may be determined if current target position and velocity have been received from the motion tracking device. If the current target position and velocity have been received from the motion tracking device, the method 2100 may proceed to block 2170. If the current target position and velocity have not been received from the motion tracking device, the method 2100 may proceed to block 2160.

In block 2160, it may be determined if a timer has expired. The timer may be an indication of how long the autonomous vehicle has not received current target position and velocity from the motion tracking device. If the autonomous vehicle does not receive the current target position and velocity from the motion tracking device with in the time allotted by the timer, the method 2100 may proceed to block 2190. If the time allotted by the timer has not expired, the method 2100 may proceed to block 2162. The timer may allow the autonomous vehicle to maintain an unsteady wireless connection with the motion tracking device but still continue to track the motion tracking device. In this and other embodiments, the unsteady wireless connection may be a wireless connection that may disconnect and then reconnect at any interval.

In some embodiments, the timer may be set by the user or determined by the autonomous vehicle. An example of the use of the timer is now provided. If the motion tracking device was attached to an arm of a user, and the user was paddling his board such that the arm of the user, and thus the motion tracking device was under the water for some periods of time, the connection between the motion tracking device and the autonomous vehicle may be disconnected. However, the user may want the autonomous vehicle to continue tracking the user. In these and other embodiments, the arm of the user, and thus the motion tracking device, may come out of the water and reestablish connection with the autonomous vehicle before the timer expires. In these and other embodiments, the connection and reconnection may occur in cycles.

In block 2162, the current location and velocity of the target may be estimated. In these and other embodiments, the current location and velocity of the target may be estimated based on a time from last receiving the location and velocity of the target and the location and the velocity previously received. In these and other embodiments, the estimated current location and velocity of the target may be used as the current location and velocity in the target following mode performed in block 2150.

In block 2170, a power level of the autonomous vehicle may be checked. When the power level of the autonomous vehicle is at an acceptable level to allow the autonomous vehicle to continue following the user, the method 2100 may proceed to block 2180. When the power level of the autonomous vehicle is at a level which the autonomous vehicle may no longer follow the user, the method 2100 may proceed to block 2190. The level at which the autonomous vehicle may no longer follow the user may be determined based on a distance between the location of the autonomous vehicle and a particular parking zone as described with respect to FIG. 18 or the start position of the autonomous vehicle. In these and other embodiments, the level at which the autonomous vehicle may no longer follow the user may be further based on weather conditions. For example, a windy day may consume more power than a non-windy day to navigate the same distance to the particular parking zone.

In block 2180, it may be determined if the autonomous vehicle has received a stop following command. When the autonomous vehicle receives a stop following command, the method 2100 may proceed to block 2190. When the autonomous vehicle has not received a stop following command, the method 2100 may proceed to block 2142. A stop follow command may be received in a similar or different manner than the start follow command. In some embodiments, the stop follow command may be sent as a data command sent over a wireless network. For example, a user may issue a command by way of a motion tracking device associated with the user. Alternately or additionally, a user may issue a command using signaling, such as waving a hand. Alternately or additionally, the autonomous vehicle may issue a stop follow command based on certain conditions. For example, the autonomous vehicle may issue a stop follow command when the autonomous vehicle detects a wave of certain size, an expiration of a timer, a particular deceleration of a motion tracking device, user, or object, or based on some other factor or event.

In block 2190, the autonomous vehicle may select a parking zone and may park in the selected parking zone. In some embodiments, the parking zone may include the start location. Alternately or additionally, the parking zone may be another location, such as a predefined location. In these and other embodiments, the autonomous vehicle may select and park following the procedures discussed with respect to FIG. 18. Alternately or additionally, the autonomous vehicle may perform other procedures to select a parking zone and park in the parking zone.

In some embodiments, the block 2190 may be followed by the block 2120. In these and other embodiments, the method 2100 may be repeated.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. For example, in some embodiments, the method 2100 may include determining the health of the autonomous vehicle. In these and other embodiments, the health of the autonomous vehicle due to technical difficulties or weather, may cause the method 2100 to proceed to block 2190.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads).

While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method for an autonomous vehicle to follow a target, the method comprising:
   obtaining a position and a velocity of a target;
   obtaining a first set position and a second set position;
   using the first set position and the second set position to determine a fixed particular autonomous vehicle path that includes the first set position and the second set position;
   obtaining a position of an autonomous vehicle along the fixed particular autonomous vehicle path;
   determining, after determining the fixed particular autonomous vehicle path, a change in the position of the autonomous vehicle along the fixed particular autonomous vehicle path based on the position of an autonomous vehicle and the position of the target, the change maintaining the autonomous vehicle along the fixed particular autonomous vehicle path; and adjusting a velocity and a direction of the autonomous vehicle to achieve the change in the position of the autonomous vehicle within the fixed particular autonomous vehicle path, the fixed particular autonomous vehicle path being maintained regardless of changes in the position of the target.

2. The method of claim 1, wherein the position of the target is a first position, the method further comprising obtaining a second position of the target that is different from the first position;

determining a second change in the position of the autonomous vehicle along the fixed particular autonomous vehicle path based on the second position of the target and the change in the position of the autonomous vehicle along the fixed particular autonomous vehicle path, the fixed particular autonomous vehicle path maintained with the second position of the target changed from the first position of the target; and adjusting the velocity of the autonomous vehicle to achieve the second change in the position of the autonomous vehicle along the fixed particular autonomous vehicle path.

3. The method of claim 1, further comprising:

obtaining a third set position; and using the first set position, the second set position, and the third set position, to determine the fixed particular autonomous vehicle path that includes the first set position, the second set position, and the third set position.

4. The method of claim 1, wherein the fixed particular autonomous vehicle path includes a straight line between the first set position and the second set position.

5. The method of claim 1, wherein the change in the position of the autonomous vehicle is determined based on a path rate of the autonomous vehicle to move along the fixed particular autonomous vehicle path, wherein the path rate is based on the velocity of the target multiplied by a variable that is reduced as the velocity of the target increases.

6. The method of claim 5, wherein the position of the autonomous vehicle is determined based on a current position of the autonomous vehicle, the path rate, and a movement calculation cycle time of the autonomous vehicle, the movement calculation cycle time including a time between calculations of velocity and direction of the autonomous vehicle.

7. The method of claim 1, wherein the change in the position of the autonomous vehicle along the fixed particular autonomous vehicle path is determined based on a projected target position along a line between and including the first set position and the second set position, the projected target position being a position on the line that is closest to the position of the target.

8. The method of claim 1, wherein the velocity and the position of the target are obtained from a motion tracking device associated with the target, wherein the velocity is an estimated velocity and the position is an estimated position.

9. The method of claim 1, further comprising:

obtaining a parking area for the autonomous vehicle;

obtaining a status of a condition affecting the autonomous vehicle, the condition selected from a group consisting of: battery life of the autonomous vehicle, mechanical properties of the autonomous vehicle, weather, and an end-of-following signal; and in response to the status of the condition, adjusting the velocity and the direction of the autonomous vehicle to cause the autonomous vehicle to arrive at the parking area.

10. A system for following a target, the system comprising:

a motion tracking device associated with a target, the motion tracking device configured to determine a target position and a target velocity of the target; and an autonomous vehicle configured to follow the target, the autonomous vehicle configured to follow the target by:

obtain the target position and the target velocity of the target from the motion tracking device;

obtain a particular offset from the target position of the target;

obtain a position of the autonomous vehicle;

obtain a substantially circular path that encloses the target position of the target and that maintains the substantially circular path having a radius substantially equal to the particular offset and having the target position of the target at an approximate center of the substantially circular path;

determining a path rate for the autonomous vehicle to move along the substantially circular path, wherein the path rate is based on the target velocity of the target multiplied by a variable that is reduced as the target velocity of the target increases;

determine a change in the position of the autonomous vehicle along the substantially circular path based on the position of the autonomous vehicle within the substantially circular path, the path rate, and the target velocity of the target; and adjust a vehicle velocity and a vehicle direction of the autonomous vehicle to achieve the change in the position of the autonomous vehicle by following the substantially circular path, the vehicle velocity and the vehicle direction of the autonomous vehicle being adjusted so that the autonomous vehicle follows the substantially circular path around the target while the target moves at the target velocity.

11. The system of claim 10, wherein the position of the autonomous vehicle is a first position of the autonomous vehicle, the autonomous vehicle further configured to:

obtain a second position of the autonomous vehicle;

determine whether the second position of the autonomous vehicle is along the substantially circular path; and in response to the second position of the autonomous vehicle not being along the substantially circular path, the autonomous vehicle is further configured to:

determine a second change in the position of the autonomous vehicle based on the second position, the substantially circular path, and the target velocity of the target; and adjust the vehicle velocity of the autonomous vehicle to achieve the second change in the position of the autonomous vehicle, wherein after the second change in the position of the autonomous vehicle, the autonomous vehicle is in the first position of the autonomous vehicle.

12. The system of claim 10, further comprising an electronic device configured with a user interface, the electronic device configured to obtain a configuration of the substantially circular path and to provide the configuration for the substantially circular path to the autonomous vehicle.

13. The system of claim 12, wherein the configuration includes the particular offset.

14. The system of claim 10, wherein to adjust the vehicle velocity and the vehicle direction of the autonomous vehicle results in the autonomous vehicle maintaining the particular offset between the autonomous vehicle and the target.

15. The system of claim 14, further comprising an electronic device that is configured to obtain the particular offset and to provide the particular offset to the autonomous vehicle.

16. The system of claim 10, wherein the change in the position of the autonomous vehicle is further based on a movement calculation cycle time of the autonomous vehicle, the movement calculation cycle time including a time between calculations of vehicle velocity and vehicle direction of the autonomous vehicle.

17. The system of claim 10, wherein adjusting the vehicle velocity and the vehicle direction of the autonomous vehicle results in the autonomous vehicle orbiting the target along the substantially circular path at an approximately consistent orbital velocity while the target moves and the target is maintained at the approximate center of the substantially circular path.

18. The system of claim 10, wherein the autonomous vehicle is further configured to:
    obtain a parking area for the autonomous vehicle;
    obtain a status of a condition affecting the autonomous vehicle, the condition selected from a group consisting of: battery life of the autonomous vehicle, mechanical properties of the autonomous vehicle, weather, and an end-of-following signal; and
    in response to the status of the condition, adjust the vehicle velocity and the vehicle direction of the autonomous vehicle to cause the autonomous vehicle to arrive at the parking area.

19. A method for an autonomous vehicle to follow a target, the method comprising:
    obtaining a particular positional relationship between a target and an autonomous vehicle;
    obtaining a target position and a target velocity of the target with respect to a home reference point;
    obtaining an autonomous vehicle position of the autonomous vehicle with respect to the home reference point;
    determining a current offset vector based on the target position and the autonomous vehicle position;
    determining an anticipated target position based on the target velocity and the target position;
    determining an anticipated offset vector based on the anticipated target position and the particular positional relationship;
    determining a change in a position of the autonomous vehicle based on the anticipated offset vector and the current offset vector; and
    adjusting a velocity and a direction of the autonomous vehicle to achieve the change in the position of the autonomous vehicle such that the autonomous vehicle follows the target.

20. The method of claim 19, further comprising:
    obtaining a parking area for the autonomous vehicle;
    obtaining a status of a condition affecting the autonomous vehicle, the condition selected from a group consisting of: battery life of the autonomous vehicle, mechanical properties of the autonomous vehicle, weather, and an end-of-following signal; and
    in response to the status of the condition, adjusting the velocity and the direction of the autonomous vehicle to cause the autonomous vehicle to arrive at the parking area.

* * * * *